United States Patent
Kim et al.

(10) Patent No.: US 12,093,497 B2
(45) Date of Patent: Sep. 17, 2024

(54) METHOD AND APPARATUS FOR PROVIDING PROTOTYPE OF GRAPHICAL USER INTERFACE

(71) Applicant: STUDIO XID KOREA, INC., Seoul (KR)

(72) Inventors: Soo Kim, Hwaseong-si (KR); Jae Won Song, Seoul (KR)

(73) Assignee: STUDIO XID KOREA, INC., Seoul (KR)

( * ) Notice: Subject to any disclaimer, the term of this patent is extended or adjusted under 35 U.S.C. 154(b) by 0 days.

(21) Appl. No.: 17/713,046

(22) Filed: Apr. 4, 2022

(65) Prior Publication Data
US 2022/0229505 A1 Jul. 21, 2022

Related U.S. Application Data

(63) Continuation of application No. 17/036,019, filed on Sep. 29, 2020, now Pat. No. 11,320,954.

(30) Foreign Application Priority Data

Dec. 24, 2019 (KR) .................. 10-2019-0173728
Aug. 7, 2020 (KR) .................. 10-2020-0099116

(51) Int. Cl.
*G06F 3/048* (2013.01)
(52) U.S. Cl.
CPC .................. *G06F 3/048* (2013.01)
(58) Field of Classification Search
CPC ........ G06F 3/048; G06F 3/0481; G06F 9/451; G06F 3/0488
See application file for complete search history.

(56) References Cited

U.S. PATENT DOCUMENTS 10,831,634 B1   11/2020   Ritter
2004/0148586 A1   7/2004   Gilboa
(Continued)

FOREIGN PATENT DOCUMENTS

CN    106970737 A    7/2017
JP    2018-109941 A    7/2018
(Continued)

OTHER PUBLICATIONS

Grant of Patent mailed by the Korean Intellectual Property Office on Mar. 8, 2022, which corresponds to Korean Patent Application No. 10-2021-0037002 and is related to U.S. Appl. No. 17/036,019; with English language translation.
(Continued)

*Primary Examiner* — Asher D Kells
(74) *Attorney, Agent, or Firm* — Studebaker & Brackett PC

(57) ABSTRACT

A method for providing an interaction scenario for a prototype of a graphical user interface (GUI) is provided. The method for providing the interaction scenario for the prototype of the graphical user interface (GUI) according to an embodiment of the present inventive concept may include identifying, by a prototype viewing device, a difference between a first version and a second version of the prototype, and generating, by the prototype viewing device, based on the difference, a second version of the interaction scenario by updating a first version of the interaction scenario pre-generated for the first version of the prototype, in which the prototype includes information on the trigger and a response caused by the trigger, and in which the interaction scenario pre-generated for the first version includes information on a plurality of triggers detected during a user's demonstration of the first version of the prototype.

9 Claims, 23 Drawing Sheets

(56) References Cited

U.S. PATENT DOCUMENTS

| | | |
|---|---|---|
| 2005/0010868 A1 | 1/2005 | Schowtka et al. |
| 2009/0100345 A1* | 4/2009 | Miller ................. G06F 11/3668 |
| | | 715/738 |
| 2009/0313608 A1 | 12/2009 | Sharma |
| 2010/0192122 A1 | 7/2010 | Esfahan et al. |
| 2011/0099499 A1* | 4/2011 | Pnueli ....................... G06F 8/38 |
| | | 715/771 |
| 2012/0054715 A1 | 3/2012 | Welchman et al. |
| 2012/0084664 A1 | 4/2012 | Torgerson et al. |
| 2012/0290959 A1 | 11/2012 | Quine |
| 2012/0311471 A1 | 12/2012 | Bullard et al. |
| 2013/0055218 A1* | 2/2013 | Schwartz ............ G06F 11/3692 |
| | | 717/131 |
| 2013/0212487 A1 | 8/2013 | Cote |
| 2014/0129935 A1 | 5/2014 | Ovadia Nahon et al. |
| 2015/0234571 A1 | 8/2015 | Lee et al. |
| 2016/0085366 A1* | 3/2016 | Chi ......................... G06F 1/163 |
| | | 345/173 |
| 2017/0131779 A1 | 5/2017 | Walkin |
| 2017/0192658 A1* | 7/2017 | Kim .................... G06F 3/04845 |
| 2018/0197103 A1* | 7/2018 | Petursson .............. G06N 20/00 |
| 2020/0387274 A1 | 12/2020 | Rodriguez Bravo et al. |

FOREIGN PATENT DOCUMENTS

| | | |
|---|---|---|
| JP | 2019-204493 A | 11/2019 |
| KR | 10-1511668 B1 | 4/2015 |
| KR | 10-1594946 B1 | 2/2016 |
| KR | 10-1640377 B1 | 7/2016 |
| KR | 10-1653795 B1 | 9/2016 |
| KR | 10-1653797 B1 | 9/2016 |
| KR | 10-1701822 B1 | 2/2017 |
| KR | 10-2017-0118576 A | 10/2017 |
| KR | 10-1818544 B1 | 2/2018 |
| KR | 10-2018-0079235 A | 7/2018 |
| KR | 10-2019-0030517 A | 3/2019 |
| KR | 10-2020-0042609 A | 4/2020 |

OTHER PUBLICATIONS

Naver Blog; "Source code comparison/text comparison free program (AcroDiff)"; [online]; Apr. 24, 2020; URL: https://blog.naver.com/broomee/221926022861; total 4 pages.

An Office Action mailed by the Korean Intellectual Property Office on Aug. 27, 2021, which corresponds to Korean Patent Application No. 10-2020-0099116 and is related to U.S. Appl. No. 17/036,019.

An Office Action mailed by China National Intellectual Property Administration on Mar. 30, 2021, which corresponds to Chinese Patent Application No. 202011085041.7 and is related to U.S. Appl. No. 17/036,019 with English language translation.

Yoshiyuki Ooshige, "Detail! Objective—C, iPhone App Development Introductory Note", Jul. 2, 2015, pp. 8-22, 1st Edition, Sotec Co., Ltd., Japan, with English language abstract.

An Office Action; "Notice of Reasons for Refusal," mailed by the Japanese Patent Office on Jan. 26, 2021, which corresponds to Japanese Patent Application No. 2020-169920 and is related to U.S. Appl. No. 17/036,019.

Office Action issued in KR 10-2019-0173728; mailed by the Korean Intellectual Property Office on Feb. 19, 2020.

Office Action issued in KR 10-2019-0173728; mailed by the Korean Intellectual Property Office on May 7, 2020.

An Office Action; "Notice of Reasons for Refusal," mailed by the Japanese Patent Office on May 16, 2023, which corresponds to Japanese Patent Application No. 2021-131488 and is related to U.S. Appl. No. 17/713,046.

The Decision to Grant a Patent mailed by the Japanese Patent Office on Aug. 29, 2023, which corresponds to Japanese Patent Application No. 2021-131488 and is related to U.S. Appl. No. 17/713,046.

* cited by examiner

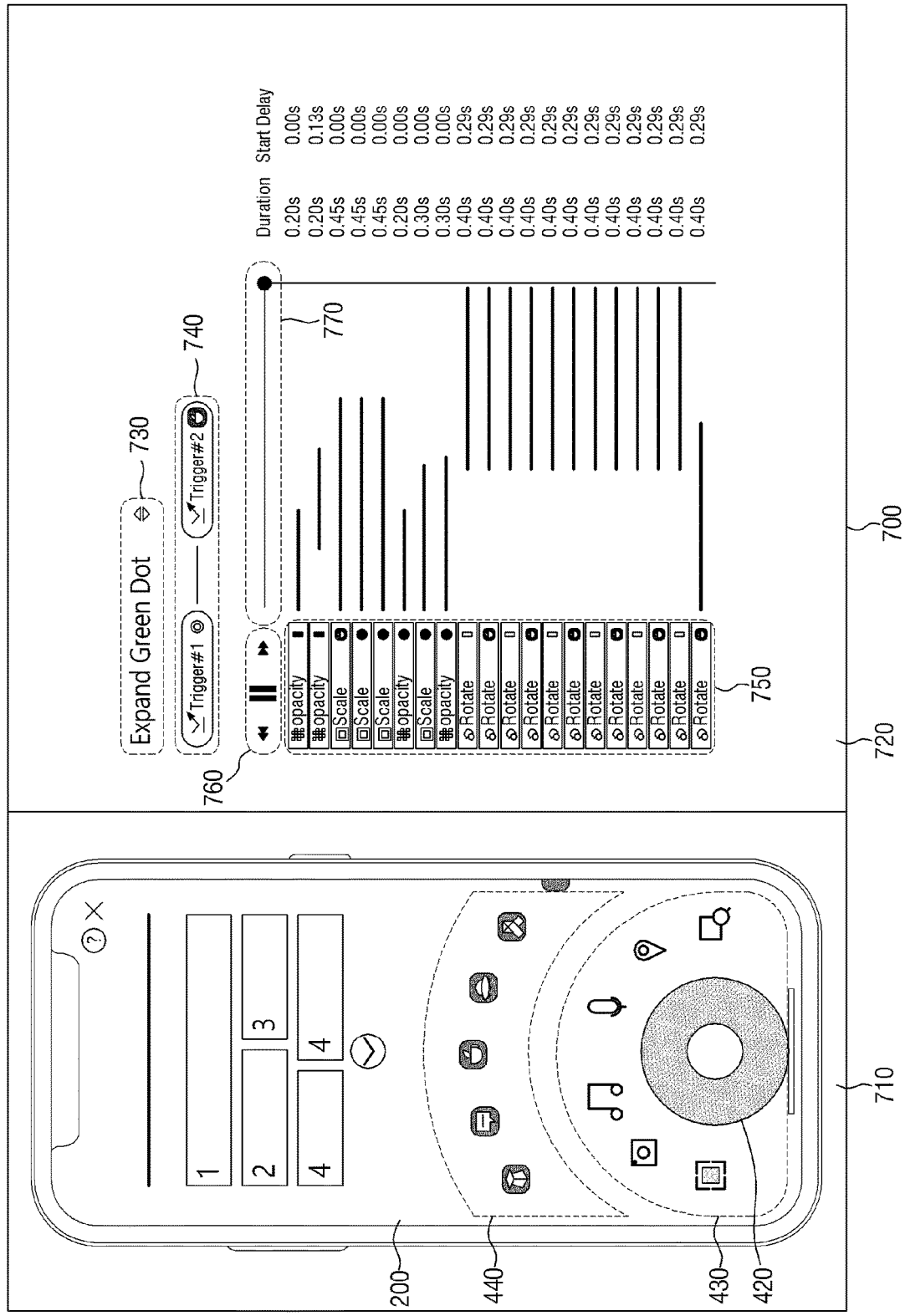

METHOD AND APPARATUS FOR PROVIDING PROTOTYPE OF GRAPHICAL USER INTERFACE

CROSS-REFERENCE TO RELATED APPLICATION

This application is a continuation application of U.S. patent application Ser. No. 17/036,019 filed on Sep. 29, 2020, which claims priority from Korean Patent Application No. 10-2019-0173728 filed on Dec. 24, 2019 and Korean Patent Application No. 10-2020-0099116 filed on Aug. 7, 2020 in the Korean Intellectual Property Office, and all the benefits accruing therefrom under 35 U.S.C. 119, the contents of which in their entirety are herein incorporated by reference.

BACKGROUND

1. Technical Field

The present inventive concept relates to a method and apparatus for providing a prototype of a graphical user interface (GUI). More specifically, it relates to a method and apparatus for generating and reproducing an interaction scenario targeting a prototype of a graphical user interface.

2. Description of the Related Art

Terminal manufacturers, application manufacturers, and online service providers are putting a lot of effort into designing a graphic user interface to increase user convenience. In the process of designing such a graphic user interface, various tools for producing a prototype of the graphic user interface are used. Before applying the graphical user interface to a terminal, application, or online service (hereinafter, referred to as "application" without distinction), a graphic user interface producer may check user convenience, user interaction, and various visual effects through a prototype of the produced graphic user interface. In addition, the graphic user interface producer may share the prototype of the graphic user interface with third parties, such as an application planner and developer, and exchange opinions with each other. The graphic user interface produced by the graphic user interface producer is provided to the application developer in the form of a prototype, that is, a prototype, and is programmed by the developer and implemented on the application.

The graphic user interface is generally composed of not only visual objects displayed on a display, but also various interactions, that is, interactions between objects and a user. As devices with touch screens are beginning to spread widely, more and more various types of rich interactions are provided on the graphic user interface to increase the user convenience. The graphic user interface may include various interactions related to various objects, and there may be a precedent relationship and/or a dependency relationship between the interactions. Therefore, when only the prototype generated by the producer of the graphic user interface is delivered to the developer, it is difficult for the developer to identify which interactions are included in the prototype of the graphical user interface and to clearly understand the principle of operation. In order clearly deliver various interactions included in the prototype to the developer, the producers of graphic user interfaces often write separate documents describing interactions included in the prototype and deliver them to the developer along with the prototype. A lot of time and money is wasted in this process.

SUMMARY

Aspects of the present inventive concept provide a method and apparatus for providing a prototype of a graphical user interface.

Aspects of the present inventive concept also provide a method and apparatus for generating an interaction scenario targeting a prototype of a graphical user interface.

Aspects of the present inventive concept also provide a method and apparatus for reproducing an interaction scenario targeting a prototype of a graphical user interface.

Aspects of the present inventive concept also provide a method and apparatus for effectively delivering details of interactions included in a prototype of a graphical user interface.

Aspects of the present inventive concept also provide a method and apparatus for effectively delivering changes that occurred in a prototype of a graphical user interface.

Aspects of the present inventive concept also provide a method and apparatus for reflecting changes that occurred in a prototype of a graphical user interface to a previously produced interaction scenario.

However, aspects of the present inventive concept are not restricted to those set forth herein. The above and other aspects of the present inventive concept will become more apparent to one of ordinary skill in the art to which the present inventive concept pertains by referencing the detailed description of the present inventive concept given below.

According to an aspect of the present inventive concept, a method for providing a prototype of a graphical user interface (GUI) is provided. The method includes, in response to a command to initiate recording an interaction scenario, receiving a user's demonstration of a GUI prototype on a prototype authoring device, detecting a first trigger occurred during the demonstration, generating the interaction scenario including information on the first trigger, and transmitting the interaction scenario by the prototype authoring device. Here, the prototype may include information on the trigger and a response to be caused by the trigger, the trigger may include a user input event, and the response may include a change in display properties of an object on the prototype.

In an embodiment, the interaction scenario further includes information on a first response caused by a first trigger. In some embodiments, the interaction scenario further includes information on a second response automatically caused by the first response acting as a trigger.

In an embodiment, the method for providing the prototype further includes detecting a second trigger occurred during the demonstration in response to the command to initiate recording the interaction scenario, in which the interaction scenario further includes information indicating an occurrence time of each of the first trigger and the second trigger.

In an embodiment, generating the interaction scenario includes storing the interaction scenario as a separate file from the prototype.

In an embodiment, the trigger includes a sensor detection event.

In order to solve the technical problems, a method for providing a prototype of a graphical user interface (GUI) according to another embodiment of the present inventive concept includes obtaining, by a prototype viewing device, an interaction scenario including information on a trigger generated on a GUI prototype, reproducing, by the prototype viewing device, the interaction scenario targeting the prototype by outputting a response automatically caused by a trigger included in the interaction scenario. Here, the prototype may include information on the trigger and a response caused by the trigger, the trigger may include a user input event, and the response may include a change in display properties of an object on the prototype.

In an embodiment, reproducing occurrence of the trigger and automatically outputting the response includes visualizing occurrence of the trigger included in the interaction scenario on the prototype. In some embodiments, the trigger includes a first type of trigger and a second type of trigger, and visualizing occurrence of the trigger includes visualizing occurrence of the first type of trigger in a first display property, and visualizing occurrence of the second type of trigger in a second display property.

In an embodiment, the method for providing the prototype further includes displaying a property of the trigger included in the interaction scenario.

In an embodiment, the method for providing the prototype further includes displaying a property of the response.

In an embodiment, reproducing occurrence of the trigger and automatically outputting the response includes displaying a change in display property values of an object included in the prototype over time.

In an embodiment, reproducing occurrence of the trigger and automatically outputting the response includes obtaining a user's input for selecting at least one part of the interaction scenario, and reproducing the selected at least one part of the interaction scenario. Here, the user's input for selecting at least one part of the interaction scenario may be an input for selecting at least one of one or more triggers included in the interaction scenario, or an input for selecting at least one of one or more responses to be caused by the one or more triggers.

In an embodiment, reproducing occurrence of the trigger and automatically outputting the response further includes displaying an output of the response in a first display area, and displaying the trigger included in the interaction scenario and the response in a second display area, wherein the response comprises a first response and a second response, the first response being caused based on the trigger being occurred and a first condition being satisfied, the second response being caused based on the trigger being occurred and the first condition not being satisfied, displaying a GUI object representing the first response and a GUI object representing the second response in a visually distinct manner, and outputting the first response, in the first display area, based on the trigger being occurred and the first condition being satisfied during the reproduction.

In some embodiments, reproducing occurrence of the trigger and automatically outputting the response further includes outputting the second response in response to a input for forcibly outputting the second response regardless of whether or not the first condition is satisfied.

In some embodiments, outputting the second response includes displaying an indication of the second response being forcibly output. Here, the displaying the indication comprises at least one of overlaying the indication on the GUI object representing the second response and displaying the indication adjacent to the GUI object representing the second response.

In an embodiment, the interaction scenario includes a comment and data on a target of the comment, in which the target of the comment is at least one of a portion of the prototype, a partial section of the interaction scenario, a trigger included in the interaction scenario, and a response caused by the trigger, and reproducing the interaction scenario targeting the prototype includes displaying the comment in data on the target of the comment.

In an embodiment, the method for providing the prototype further includes displaying a GUI object indicating an initiation time and a duration time of the response.

In an embodiment, the interaction scenario and the prototype may be provided as an electronic document that may be viewed with a web browser.

According to an aspect of the present inventive concept, a method for providing a prototype of a graphical user interface (GUI) is provided. The method includes receiving a user's demonstration of a GUI prototype on a prototype authoring device in response to a command to initiate recording an interaction scenario, detecting a first trigger occurred during the demonstration, generating the interaction scenario including information on the first trigger, transmitting, by the prototype authoring device, the interaction scenario, obtaining, by a prototype viewing device, the interaction scenario, and reproducing, by the prototype viewing device, the interaction scenario targeting the prototype by outputting a response automatically caused by a trigger included in the interaction scenario. Here, the prototype may include information on the trigger and a response caused by the trigger, the trigger may include a user input event, and the response may include a change in display properties of an object on the prototype.

According to an aspect of the present inventive concept, a method for providing an interaction scenario for a prototype of a graphical user interface (GUI) is provided. The method includes identifying, by a prototype authoring device, a difference between a first version and a second version of the prototype, and generating, by the prototype authoring device, based on the difference, a second version of the interaction scenario by updating a first version of the interaction scenario, the first version of the interaction scenario being pre-generated for the first version of the prototype, in which the prototype includes information on the trigger and a response to be caused by the trigger, and in which the first version of the interaction scenario includes information on a plurality of triggers detected during a user's demonstration of the first version of the prototype.

In an embodiment, identifying the difference may include identifying a trigger added to the second version of the prototype, and generating the second version of the interaction scenario may include obtaining a user input for a location where the added trigger is to be inserted.

In an embodiment, obtaining the user input for the location where the added trigger is to be inserted may include obtaining a user input for selecting one of triggers included in the first version of the interaction scenario, and inserting the added trigger immediately before or immediately after the selected one of the triggers.

In an embodiment, obtaining the user input for the location where the added trigger is to be inserted may include displaying a timeline of the first version of the interaction scenario, and obtaining a user input for selecting a specific location on the timeline.

In an embodiment, identifying the difference may include identifying a trigger deleted from the first version of the prototype and a trigger added to the second version of the prototype, and generating the second version of the interaction scenario may include determining a similarity between the deleted trigger and the added trigger.

In an embodiment, generating the second version of the interaction scenario may further include generating, based on the determination that the similarity is equal to or greater than a threshold, the second version of the interaction scenario by replacing, in the first version of the interaction scenario, the deleted trigger with the added trigger.

In an embodiment, determining the similarity between the deleted trigger and the added trigger may include determining a degree of overlap between responses caused by the deleted trigger and responses caused by the added trigger.

In an embodiment, determining the similarity between the deleted trigger and the added trigger may include determining whether a first GUI object in which a change in display properties is caused by the deleted trigger and a second GUI object in which a change in display properties is caused by the added trigger are identical to each other.

In an embodiment, the interaction scenario may further include information on a plurality of responses caused by the plurality of triggers detected during the user's demonstration.

In an embodiment, the interaction scenario may further include information on a response that is automatically caused by at least one of the plurality of responses acting as a trigger.

According to an aspect of the present inventive concept, a method for providing a prototype of a graphical user interface (GUI) is provided. The method includes obtaining, by a prototype viewing device, an interaction scenario including information on a trigger occurred on a GUI prototype, and reproducing, by the prototype viewing device, occurrence of a trigger and automatically outputting a response caused by the trigger according to the interaction scenario for the prototype, in which the prototype includes information on a trigger and a response to be caused by the trigger.

In an embodiment, at least some of triggers included in the first version of the interaction scenario and triggers included in the second version may be different from each other, or at least some of responses included in the first version of the interaction scenario and responses included in the second version may be different from each other.

In an embodiment, reproducing according to the first version and the second version of the interaction scenario may include reproducing according to the first version of the interaction scenario in a first display area, and reproducing according to the second version of the interaction scenario in a second display area, in which the reproduction according to the first version and the reproduction according to the second version are synchronized with each other.

In an embodiment, reproducing according to the first version and the second version of the interaction scenario may include, in response to a user's selection for a first trigger of a plurality of triggers included in a first version of the interaction scenario, displaying a property associated with the first trigger, and displaying a property associated with a second trigger, the second trigger corresponding to the first trigger of a plurality of triggers included in a second version of the interaction scenario.

In an embodiment, reproducing according to the first version and the second version of the interaction scenario may include displaying, in response to a user's selection for a first response of a plurality of responses included in the first version of the interaction scenario, a property specified in the first response, and displaying a property specified in a second response corresponding to the first response of a plurality of responses included in the second version of the interaction scenario.

In an embodiment, reproducing according to the first version and the second version of the interaction scenario may include identifying a difference between a first version and a second version of the interaction scenario, and displaying translucently at least some objects of the first version or the second version of the interaction scenario, based on the difference.

In an embodiment, reproducing according to the first version and the second version of the interaction scenario may include initiating reproduction according to the first version of the interaction scenario, obtaining a user input for requesting reproduction according to the second version of the interaction scenario, identifying, in response to the user input, the second response of the second version of the interaction scenario corresponding to the first response of the first version of the interaction scenario being reproduced, and outputting the second response of the second version of the interaction scenario.

According to an aspect of the present inventive concept, a computer readable non-transitory recording medium is provided. The computer readable non-transitory recording medium concept stores a computer program for performing a method including identifying, by a prototype authoring device, a difference between a first version and a second version of a prototype, and generating, by the prototype authoring device, based on the difference, a second version of the interaction scenario by updating a first version of the interaction scenario pre-generated for the first version of the prototype.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Figure 1:
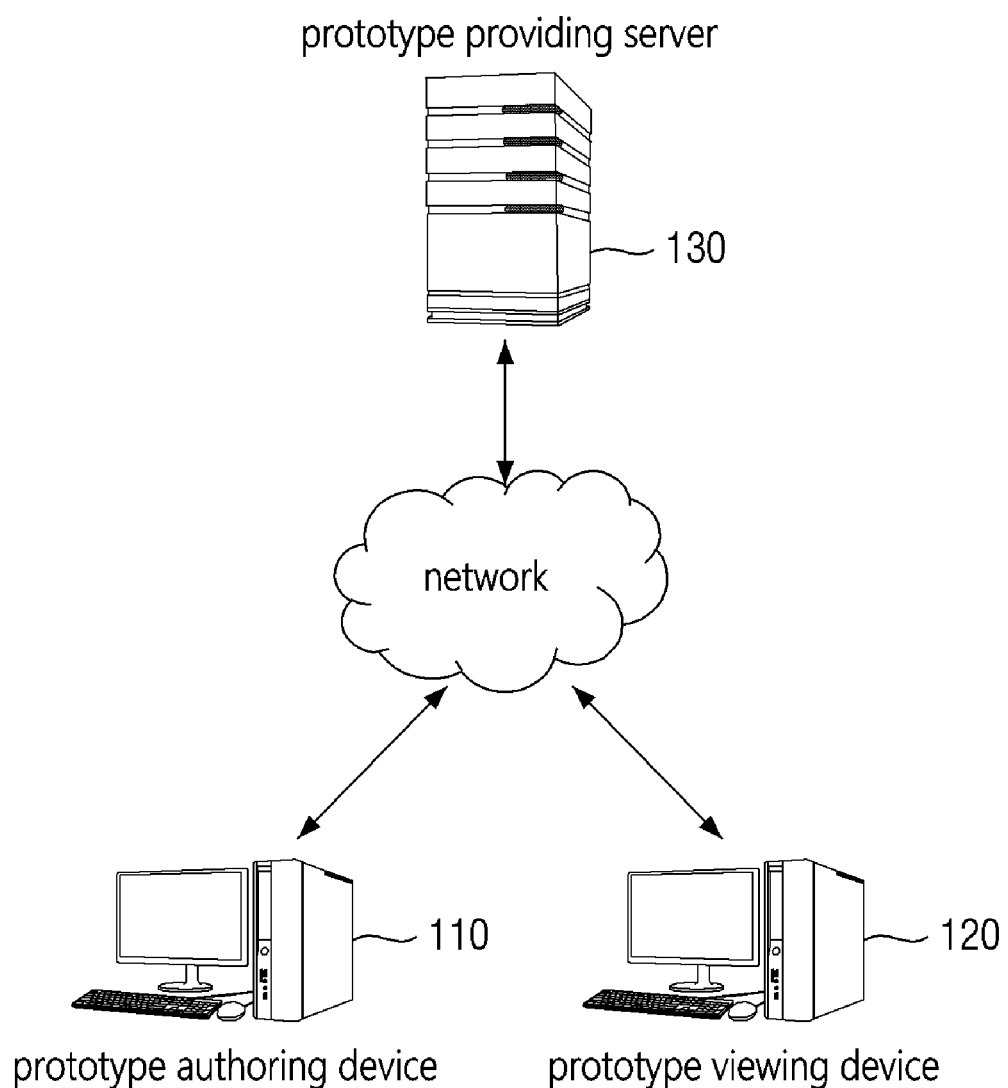
FIG. 1 is a block diagram of a system for providing a graphic user interface prototype according to an embodiment of the present inventive concept.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

First, the meaning of terms used in the present specification will be described.

First of all, an "author" is a person who prototypes a graphical user interface, such as a designer. An "authoring device" is a device used to author a graphical user interface prototype and to generate a scenario for demonstrating interactions implemented in the prototype.

Next, a "viewer" is a person who receives and views the prototype created by the author and uses information extracted from the prototype, such as a developer, planner, and/or decision maker. A "viewing device" is a device used by the viewer to view the prototype. The viewing device may be understood as a device that executes the prototype or a device that reproduces or plays back an interaction scenario for the prototype. The viewing device may be a device of the same type as a target device on which a graphic user interface to be created will ultimately be executed.

In the present specification, a "trigger" is an event that causes a visual change in the graphical user interface and/or any reaction or feedback of a device in which the graphical user interface is implemented. The trigger may be a user input on the graphic user interface, other external input such as a sensor, or other event occurring on the graphic user interface. The trigger may be an event caused by a touch input or gesture to a touch screen provided in a device to which the graphic user interface is applied, a user input through devices such as a mouse or a keyboard, or data measured by a sensor provided in the device (e.g., a camera, a microphone, an acceleration sensor, a gyro sensor, a proximity sensor, a geomagnetic sensor, etc.) or a sensor that provides data to the device from outside the device (e.g., an illuminance sensor, a temperature sensor, a human body detection sensor, etc.).

In the present specification, a "response" means a reaction caused by the trigger. For example, the response may be a change in display properties (location, size, transparency, color, azimuth, etc.) of an object of the graphic user interface. In this case, output of the response may mean execution of an operation that changes the display property of the object. For another example, the response may be haptic feedback or sound feedback of a device in which the graphic user interface is implemented. Meanwhile, the response may act as a trigger that triggers another response.

Meanwhile, the trigger may be defined to cause different responses according to an occurrence condition of the trigger.

An "interaction set" is a term referring to a collection of triggers and responses caused by the trigger.

The "interaction" is a term generically referring to the occurrence of an event detected on the graphical user interface and a series of reactions in response thereto. The graphical user interface may consist of GUI objects and a series of interactions.

The "interaction scenario" is data for reproducing at least some of interactions applied to the prototype of the graphical user interface sequentially or out of order.

FIG. 1 is a block diagram of a system for providing a graphic user interface prototype according to an embodiment of the present inventive concept.

Referring to FIG. 1, the system for providing the prototype may include a prototype authoring device 110, a prototype viewing device 120, and a prototype providing server 130.

The prototype authoring device 110 is a device that authors a prototype of a graphical user interface and generates an interaction scenario for the prototype. The prototype authoring device 110 may provide the authored prototype to the prototype providing server 130 or the prototype viewing device 120. The prototype authoring device 110 may be a device of the same type as a target device to which a graphic user interface to be authored is applied, or a different type of device. In the process of authoring and/or demonstrating a prototype, the target device is connected to the prototype authoring device 110 by wire or wirelessly, such that it may be used to input or define a trigger to be included in the prototype, or to check a response caused by the trigger.

The prototype viewing device 120 is a device that views or executes the prototype of the graphical user interface. In the present specification, "viewing a prototype" and "executing a prototype" are used interchangeably. In addition, the prototype viewing device 120 may be a device that reproduces or plays back an interaction scenario for the prototype of the graphical user interface. The prototype viewing device 120 may obtain a prototype and/or an interaction scenario from the prototype authoring device 110 or the prototype providing server 130.

The prototype viewing device 120 may be a device of the same type as the target device to which the graphic user interface to be authored is applied, or a different type of device. When the prototype viewing device 120 is a device of a different type from the target device, the prototype may be displayed and executed in a graphic object that simulates a screen of the target device displayed in a user interface of the prototype viewing device 120.

According to an embodiment, the prototype authoring device 110 and the prototype viewing device 120 may include a computing device that may be connected to each other through a network. For example, the prototype authoring device 110 and the prototype viewing device 120 may include devices such as a server, a desktop PC, a notebook, and a smartphone including one or more processors. The prototype authoring device 110 and the prototype viewing device 120 may be, for example, a computing device 1500 shown in FIG. 13.

The prototype providing server 130 may receive the prototype and/or the interaction scenario from the prototype authoring device 110 and provide it to the prototype viewing device 120. The prototype providing server 130 may be any server that transmits/receives and exchanges data through various protocols such as a file server, a web server, or the like. Hereinafter, a method for providing a prototype of a graphic user interface according to another embodiment of the present inventive concept will be described in more detail with reference to FIGS. 2 to 5. In particular, a method for generating an interaction scenario targeting a prototype will be described. The method for providing the prototype according to the present embodiment may be performed by the prototype authoring device 110.

Figure 2:
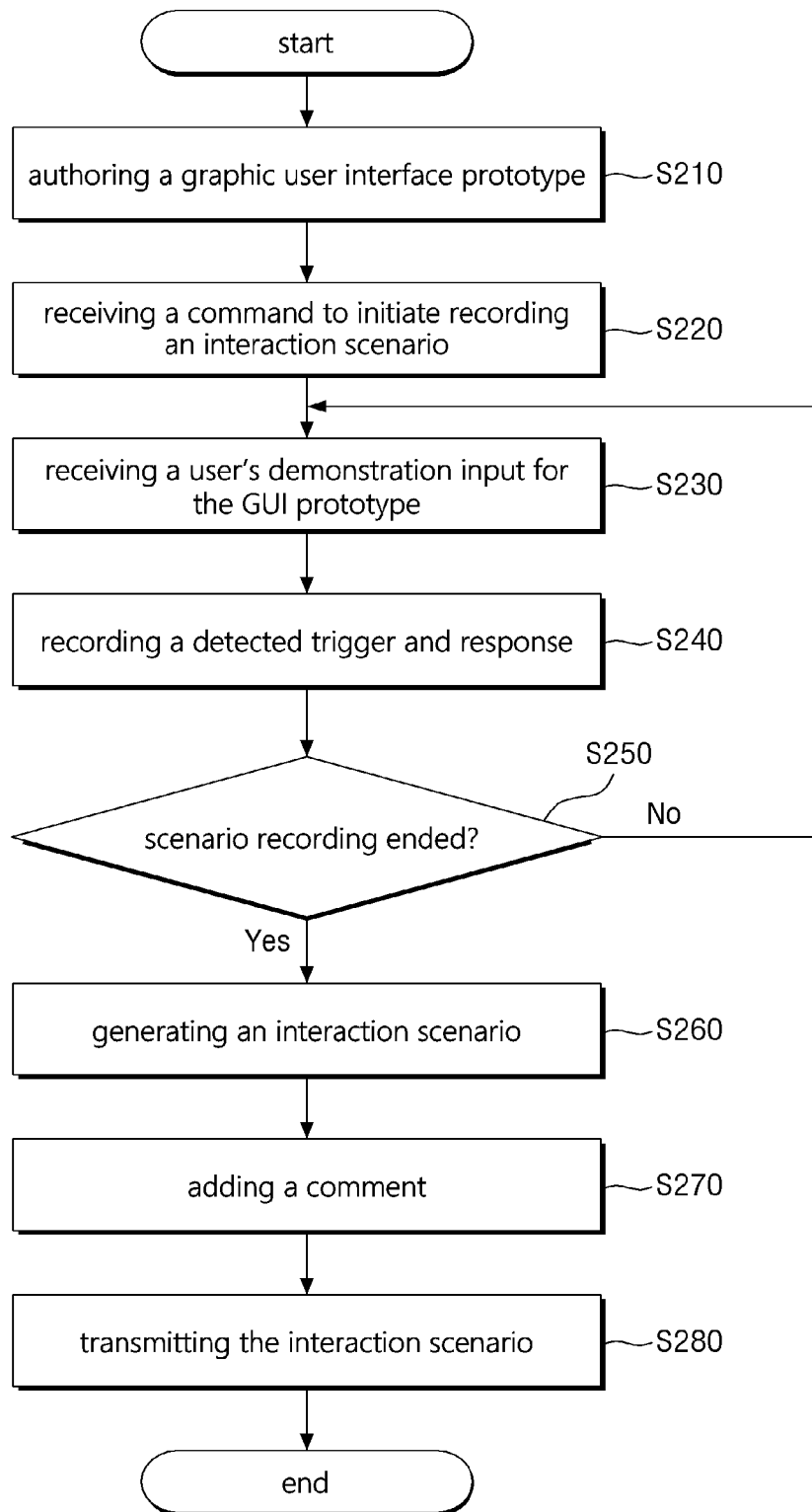
FIG. 2 is a flow chart illustrating a process of performing a method for providing a prototype of a graphical user interface according to another embodiment of the present inventive concept.

FIG. 2 is a flow chart illustrating a process of performing the method for providing the prototype of the graphical user interface according to the embodiment of the present inventive concept.

First, in step S210, a graphic user interface prototype 200 is authored by the prototype authoring device 110. Various conventional tools and techniques for prototyping the graphical user interface may be used to author the prototype. The prototype 200 may include one or more graphical user interface objects and an interaction set (i.e., a collection of triggers and responses) associated with at least some objects.

In some embodiments, in step S210 of authoring the prototype, a target device is connected to the prototype authoring device 110 by wire or wirelessly, such that it may be used to input or define a trigger to be included in the prototype, or to check a response caused by the trigger.

In step S220, the prototype authoring device 110 displays a user interface 300 for generating an interaction scenario of the prototype, and receives a command to initiate recording the interaction scenario.

Figure 3:
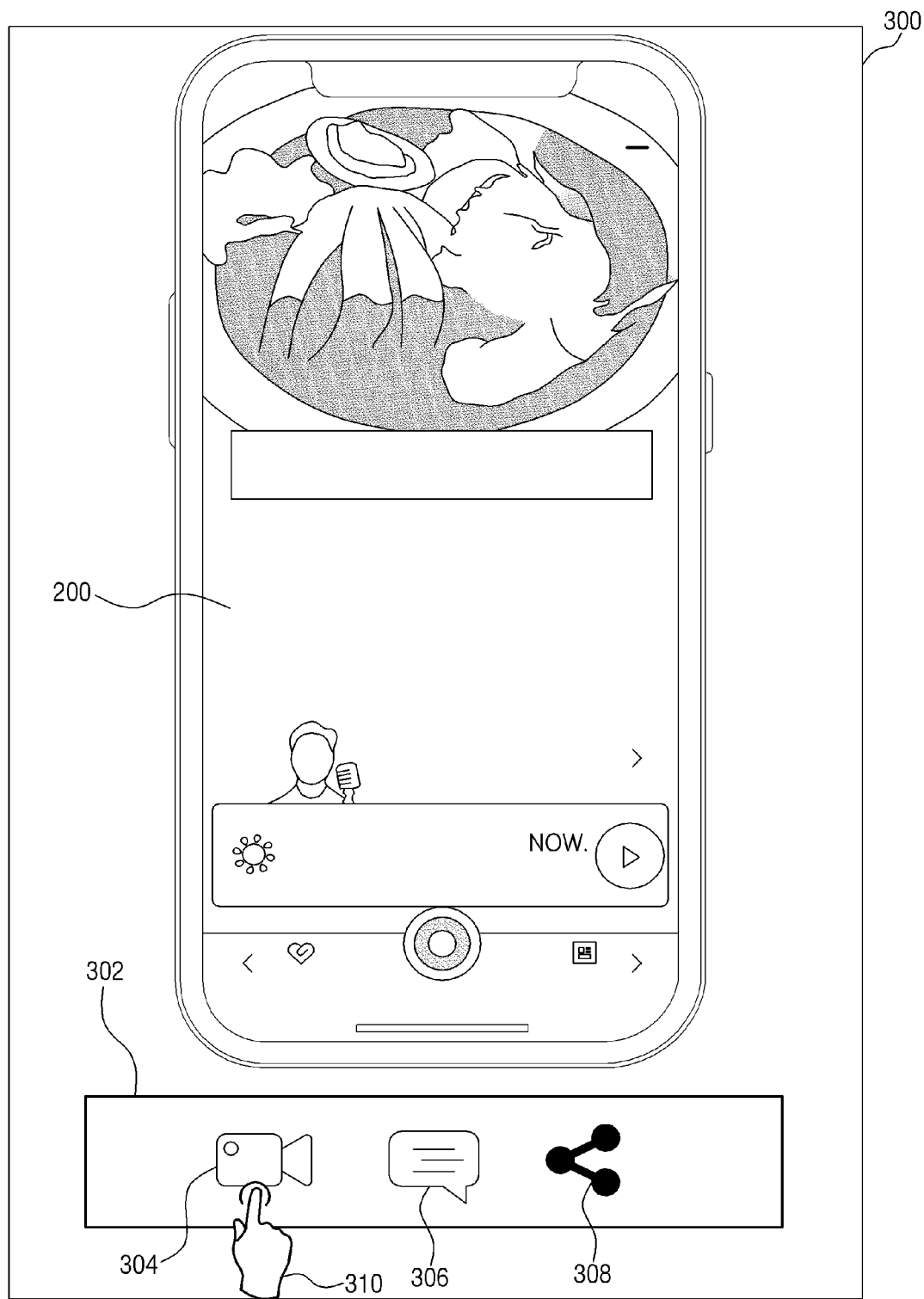
FIGS. 3 to 5 are diagrams for explaining a process of recording an interaction scenario of a graphical user interface prototype according to the embodiment described with reference to FIG. 2.

FIG. 3 is a diagram illustrating an exemplary display of a user interface 300 for generating an interaction scenario targeting the prototype 200 authored in step S210 on the prototype authoring device 110. Referring to FIG. 3, the interface 300 includes an area displaying the authored prototype 200 and an area 302 providing GUI objects 304, 306, and 308 related to the generation of the interaction scenario. A user of the prototype authoring device 110 may demonstrate or manipulate the prototype 200 displayed on the interface 300.

In step S220, by receiving, for example, the user's input 310 of selecting an interaction scenario recording initiation button 304 of the user interface 300, recording of the interaction scenario targeting the prototype 200 may be started. In some embodiments, when recording of the interaction scenario starts, a display property of the interaction scenario recording initiation button 304 is changed, so that it may be visually expressed that the interaction scenario is being recorded.

In steps S230 to S250, the user's demonstration of the prototype 200 is input, and interactions occurring during the demonstration are recorded. Here, it is noted that a video recording a series of interactions that occurred during the user's demonstration targeting the prototype 200 is not recorded, but an identifier of the trigger causing the change of the objects included in the prototype or an occurrence time of the trigger are recorded.

Steps S230 to S250 will be described with reference to FIGS. 4A to 4C.

In step S230, the prototype authoring device 110 receives the user's demonstration input for the prototype 200. The user may demonstrate the prototype 200 by interacting with objects included in the prototype 200 on the interface 300 of the prototype authoring device 110, and the prototype authoring device 110 may receive data occurred by the user's demonstration.

Figure 4A:
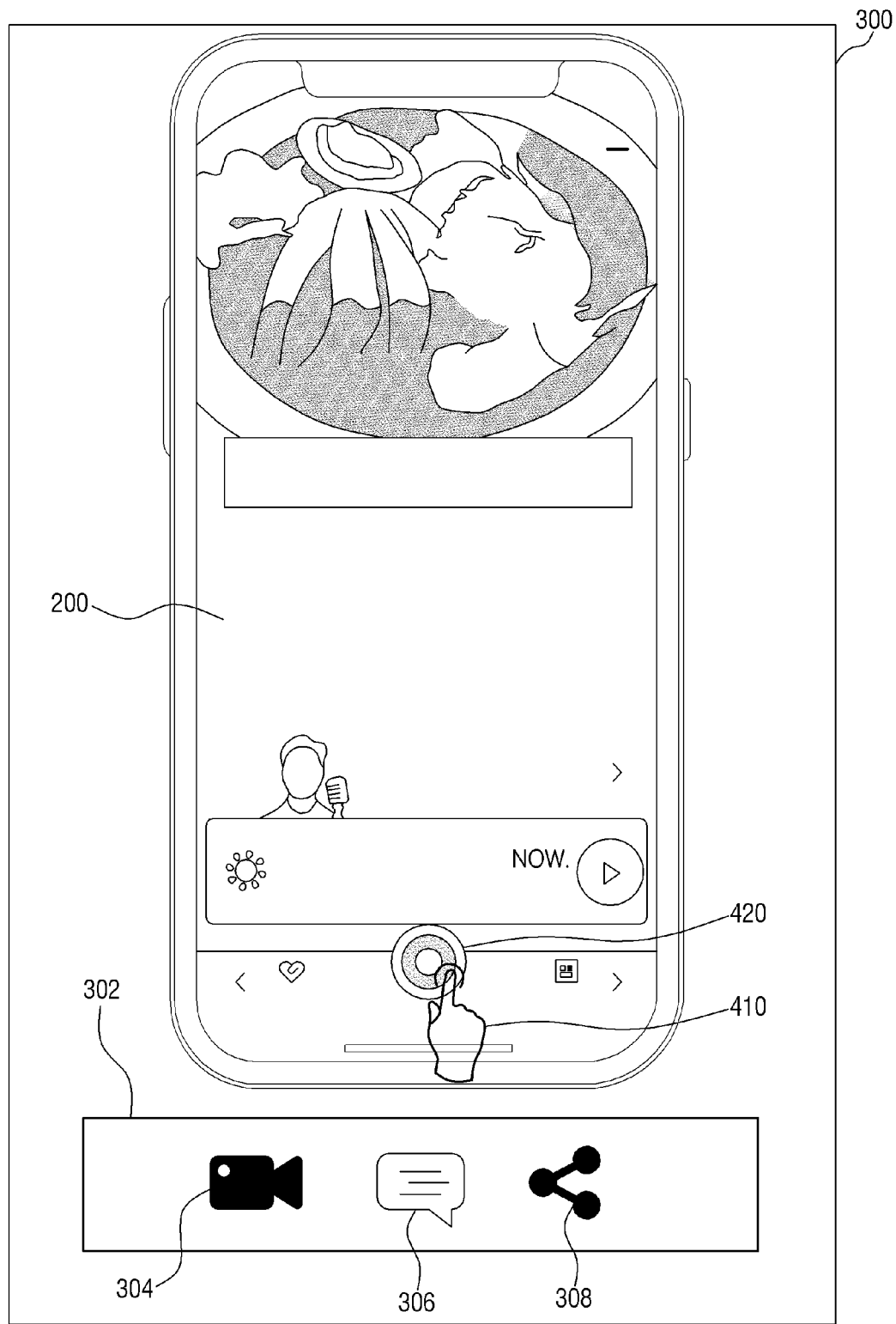
Figure 4B:
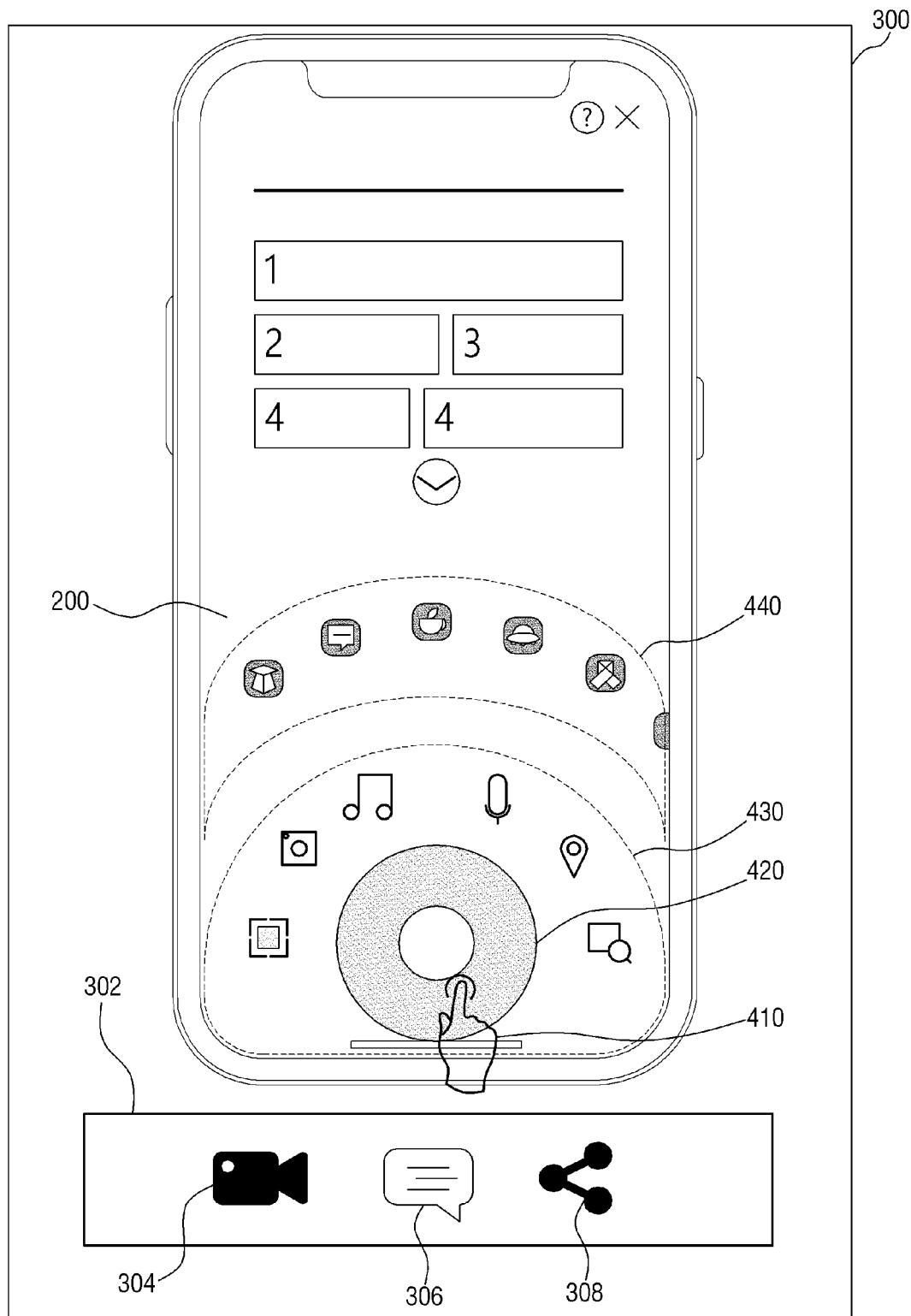
Figure 4C:
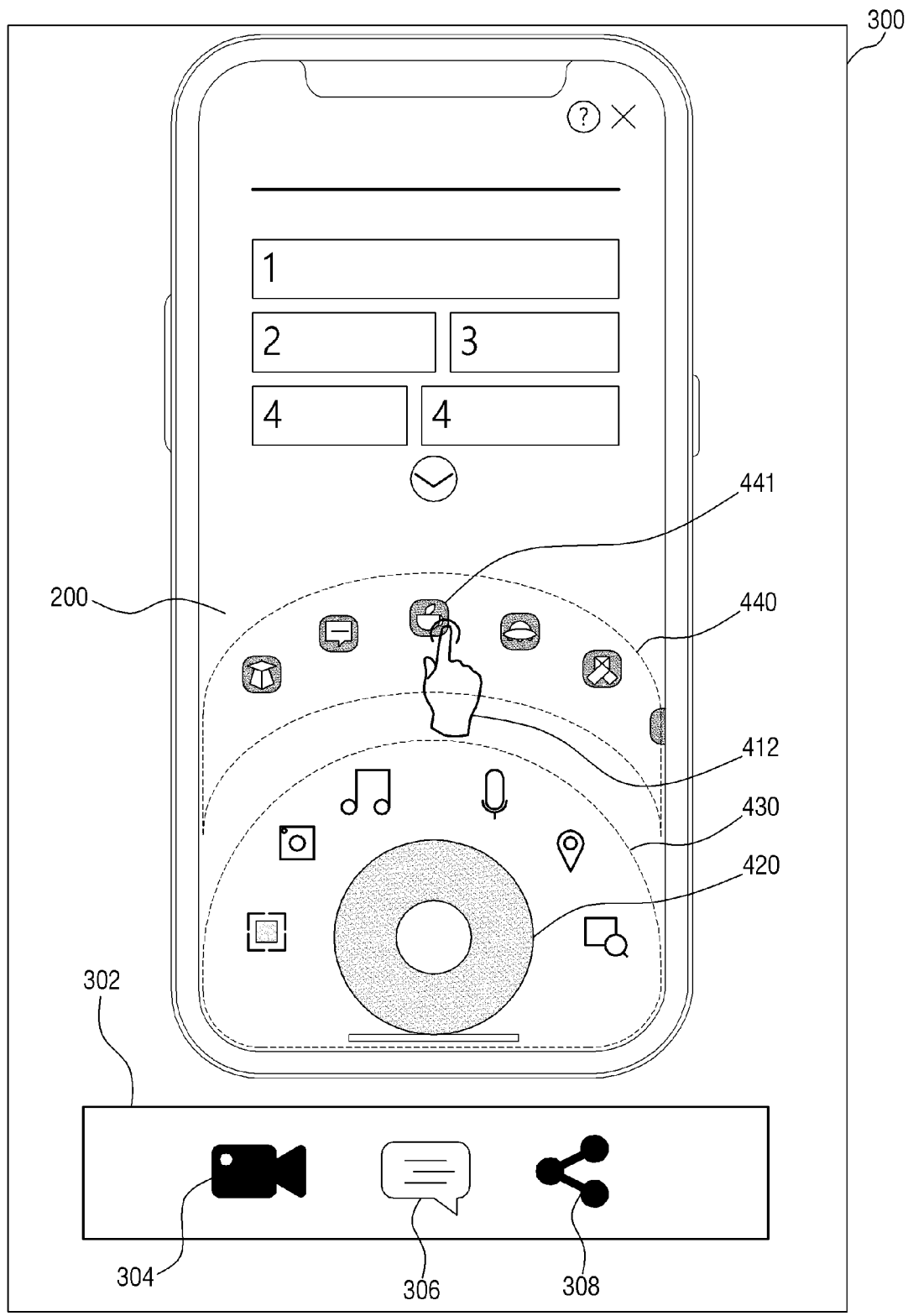

FIGS. 4A to 4C are diagrams showing exemplary appearances of the prototype 200 during the user's demonstration of the prototype 200. FIG. 4A shows a user touching an object 420 included in the prototype 200, and FIG. 4B shows a state in which a display property of objects 420, 430, and 440 of the prototype 200 are changed as a result of the touch. Specifically, referring to FIG. 4B, due to a touch input on the object 420, a change in size property of the object 420 and a change in transparency of the object 430 and the object 440 are caused. In other words, the size of the object 420 has been enlarged, and the hidden object 430 and the object 440 in the state shown in FIG. 4A are visually displayed. In this regard, a touch event occurred for the object 420 is a trigger, and the change in size property of the object 420 and the change in transparency of the object 430 and object 440 are responses caused by the trigger. It is noted that, during the demonstration of the prototype 200, instead of touching the object 420, the user of the prototype authoring device 110 may define an event of touching the object 420 as the trigger by performing an operation of clicking the object 420 with a pointing device such as a mouse, for example.

In some embodiments, in step S230, a target device (not shown) is connected to the prototype authoring device 110 and may be used for the demonstration of the prototype 200. The user manipulates the prototype 200 on the target device to demonstrate, and the prototype authoring device 110 may receive data related to the user's demonstration from the target device.

In step S240, a trigger detected during the user's demonstration is recorded. For example, the touch event for the object 420 described with reference to FIGS. 4A and 4B may be recorded as the trigger. In some embodiments, responses caused by the trigger may also be recorded. For example, changes in display properties of objects 420, 430, and 440 exemplarily illustrated in FIG. 4B may be recorded as a response. In some other embodiments, when a first response caused by the trigger causes a second response that is distinguished from the first response, the first response may be recorded as a trigger that triggers the second response.

In step S250, it is determined whether recording of the interaction scenario has ended. For example, it is determined whether or not an interaction scenario recording end command has been received from the user. If the recording of the interaction scenario is not ended, it returns to step S230, and the process of receiving the user's demonstration input (S230) and recording the trigger and response detected during the user's demonstration (S240) may be repeated. For example, as shown in FIG. 4C, a touch event for the object 441 included in the prototype 200 is detected during the user's continued demonstration, and the response caused by the touch (i.e., trigger) is output on the prototype 200, and the trigger and response may be recorded.

In step S260, an interaction scenario may be generated based on triggers and responses detected during the user's demonstration. In the embodiments of the present inventive concept, it is noted that the interaction scenario is not a video recording a series of interactions that occurred during the user's demonstration targeting the prototype 200.

In some embodiments, the interaction scenario may include information on the trigger detected during the user's demonstration, but may not include information on the response caused by the trigger. In this case, in order to reproduce the interaction scenario on the prototype viewing device 112, the interaction scenario and the prototype must be provided together, and the interaction scenario functions as data that generates a trigger on the prototype. In some other embodiments, the interaction scenario may include both information on the trigger and the response.

In some embodiments, the interaction scenario may include information on an occurrence time of the trigger detected during the user's demonstration. For example, the interaction scenario may include information on an order of occurrence of the first trigger and the second trigger detected during the user's demonstration. As another example, the interaction scenario may include information on a time that has elapsed until the first trigger and the second trigger are detected, respectively, after the user's demonstration is initiated.

In some embodiments, data describing the interaction scenario may be provided in combination with data describing the prototype.

In some other embodiments, the data describing the interaction scenario is not integrated with the data describing the prototype, but may be stored as a separate file and provided to the prototype viewing device 120 or the viewer. When a plurality of interaction scenarios for one prototype are produced, or the interaction scenario is modified several times and provided in sequence, it may be efficient to separate interaction scenario data from prototype data.

In step S270, a comment input is received from the user, and information on the comment may be added to the interaction scenario. This will be described with reference to FIG. 5.

Figure 5:
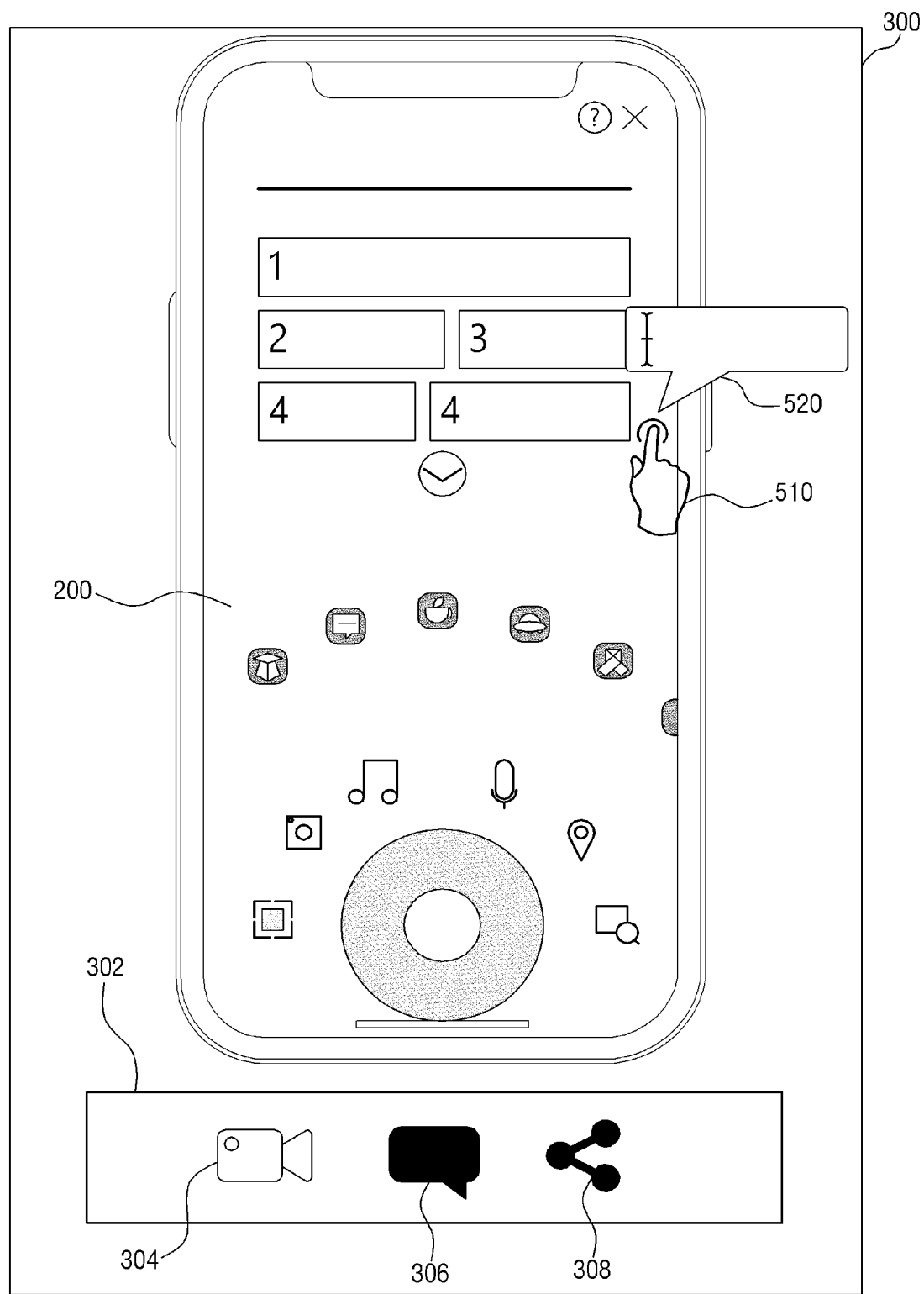

Referring to FIG. 5, for example, by receiving a user input 310 of selecting a comment input initiation button 306 in the user interface 300, the user's comment input may be initiated. The comment may be a comment targeting a part of the prototype 200, a comment targeting some section of the interaction scenario, a comment targeting some triggers included in the interaction scenario, or a comment targeting some responses. As will be described later, depending on a target of the comment, a location or a viewpoint at which the comment is displayed may be different during the reproduction of the interaction scenario by the prototype viewing device 120.

As exemplarily illustrated in FIG. 5, by receiving the user's input 510 of specifying a specific part of the prototype, the specific part of the prototype may be specified as a target of the comment. In addition, when the user's input 510 of specifying the target of the comment is received, a layer 520 for inputting a comment is displayed on the user interface 300, and contents of the comment may be input from the user.

In step S280, the interaction scenario may be stored and transmitted to the prototype providing server 130 or provided to the prototype viewing device 120.

In the description of the present embodiment with reference to FIGS. 2 to 5, the user input on the graphic user interface prototype 200 has been described as an example of the trigger included in the interaction scenario, but the present inventive concept is not limited to such an embodiment. As described above, the trigger includes an event occurred by an external input such as data measured by a sensor. It may be understood that, in the user interface 300 for generating the interaction scenario provided on the prototype authoring device 110, a function for specifying an event occurred by an external input such as a sensor as a trigger and including it in the interaction scenario may be provided.

Until now, the method for generating the interaction scenario targeting the prototype according to an embodiment of the present inventive concept has been described with reference to FIGS. 2 to 5. Hereinafter, with reference to FIGS. 6 to 12, a method for reproducing an interaction scenario targeting a prototype will be described according to another embodiment of the present inventive concept. The method for reproducing the interaction scenario according to the present embodiment may be performed by the prototype viewing device 120.

Figure 6:
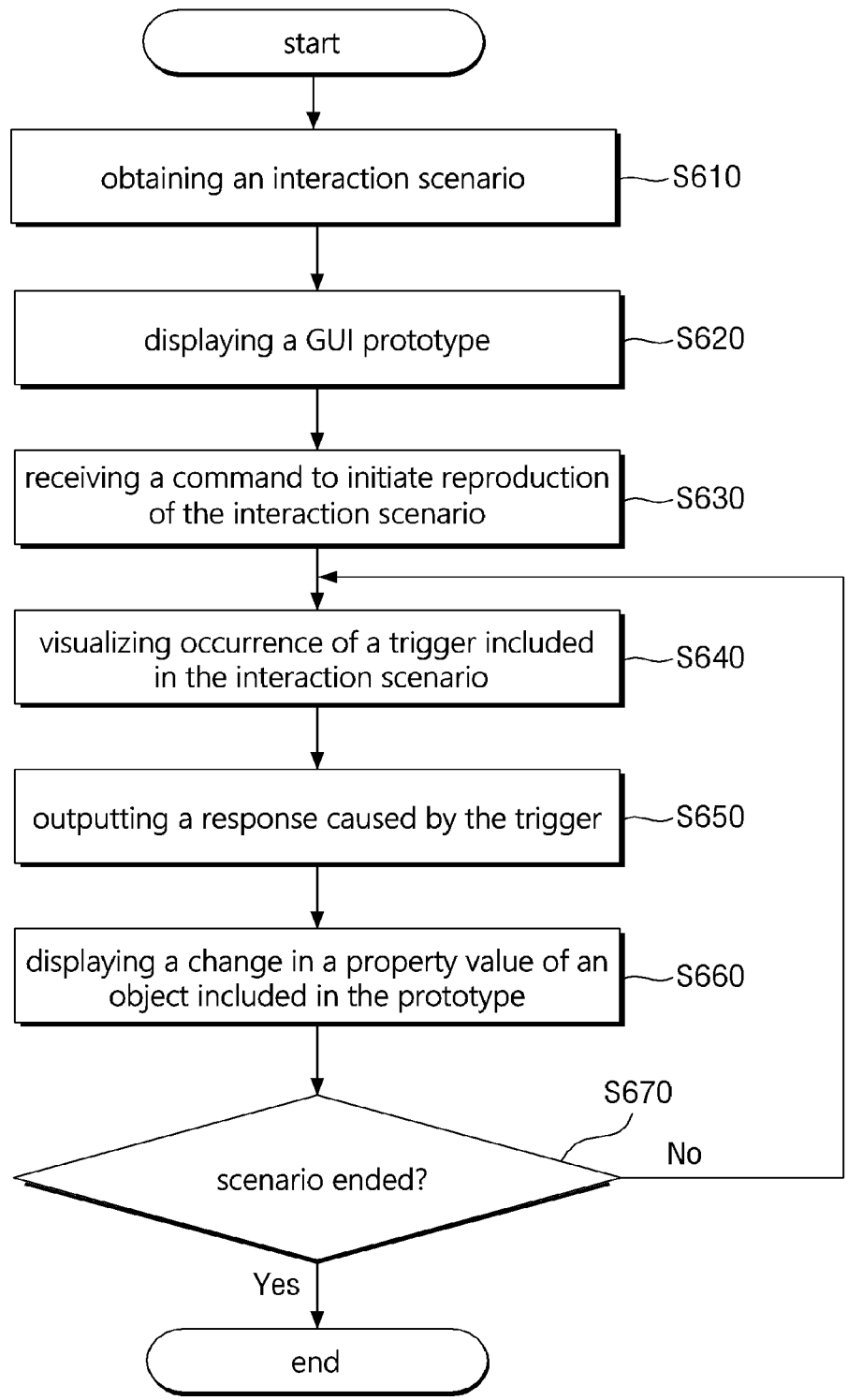
FIG. 6 is a flow chart illustrating a process of performing a method for providing a prototype of a graphical user interface according to another embodiment of the present inventive concept.

FIG. 6 is a flow chart illustrating a process of performing a method for providing a prototype of a graphical user interface according to an embodiment of the present inventive concept.

First, in step S610, the prototype viewing device 120 obtains an interaction scenario. The interaction scenario may be obtained from the prototype providing server 130 or the prototype authoring device 110. In an embodiment in which a graphic user interface prototype and the interaction scenario are provided as separate data, the prototype of the graphic user interface may also be obtained in step S610. In some embodiments, the graphical user interface prototype and the interaction scenario may be an electronic document stored on the prototype providing server 130. In this case, the graphical user interface prototype and the interaction scenario may be obtained by accessing a URL pointing to the electronic document through a web browser of the prototype viewing device 120 or the like.

As described above, the interaction scenario includes information on a trigger detected during a user's demonstration in the prototype authoring device 110. In some embodiments, the interaction scenario further includes information on a response caused by the detected trigger. In some embodiments, the interaction scenario may include information on a time when the trigger occurs. In the embodiments of the present inventive concept, it is noted that the interaction scenario is not a video recording a series of interactions occurred during a demonstration targeting the prototype 200.

In step S620, the prototype viewing device 120 may display a user interface 700 for reproducing the interaction scenario for the prototype.

Figure 7:
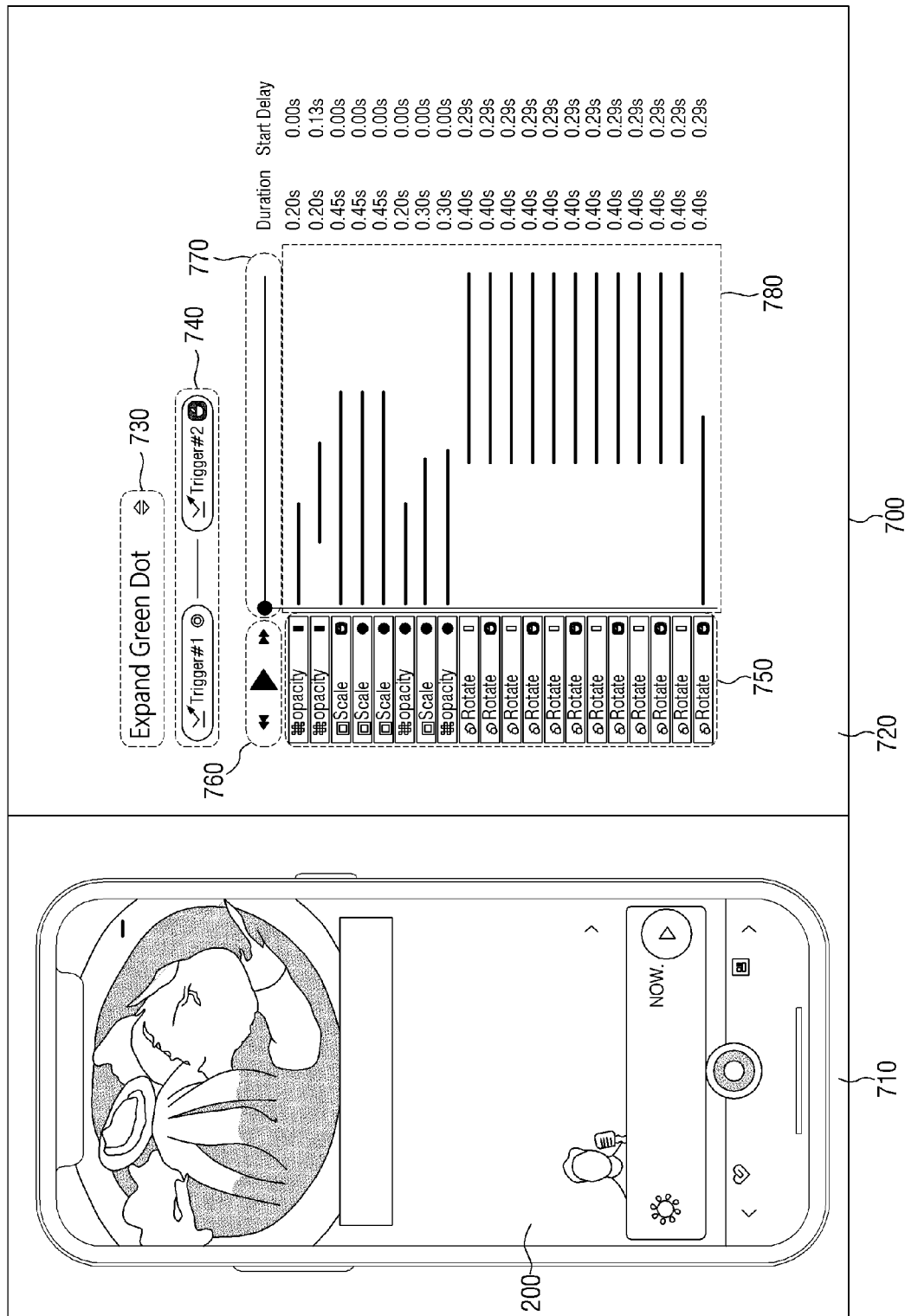
FIGS. 7 to 12 are diagrams for explaining a process of reproducing an interaction scenario of a graphical user interface prototype according to the embodiment described with reference to FIG. 6.

Referring to FIG. 7, the user interface 700 for reproducing the interaction scenario includes a first area 710 for displaying the prototype 200, and a second area 720 for controlling the reproduction of the interaction scenario and for displaying details of the interaction scenario and the prototype 200. In step S620, the prototype 200 is displayed in the first area 710.

Referring to FIG. 7, a GUI object 730 for selecting any one of one or more interaction scenarios related to the prototype, GUI objects 740 for selecting some of one or more triggers included in a selected interaction scenario, GUI objects 750 corresponding to one or more responses caused by a selected trigger, objects 760 for controlling reproduction or playback of the interaction scenario, a progress bar 770 for indicating a timeline of the interaction scenario, a GUI object indicating an initiation time and duration time of the responses, or the like may be displayed in the second area 720.

In step S630, a command to initiate reproduction of the interaction scenario is received. For example, a user's input for selecting a reproduction start button among GUI objects 760 for controlling reproduction of the interaction scenario may be received.

In steps S640 to S660, the interaction scenario for the prototype 200 is reproduced, the occurrence of the triggers included in the interaction scenario are visualized while the reproduction is being performed, and the responses caused by the trigger are output on the prototype 200. Steps S640 to S660 will be described with reference to FIGS. 8A to 11.

Figure 9:
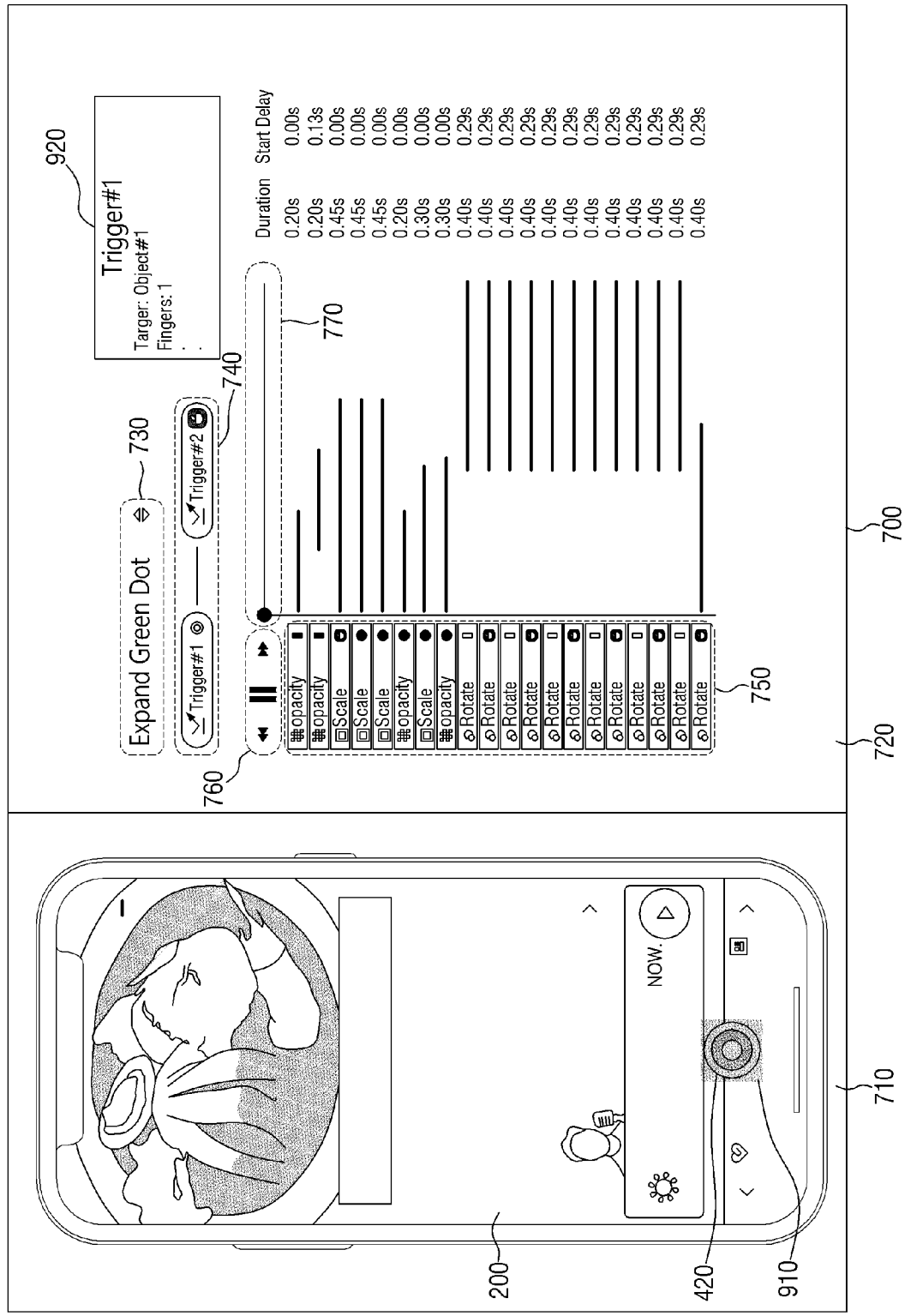

In step S640, the reproduction of the interaction scenario is initiated, and the occurrence of the trigger included in the interaction scenario is visualized. FIG. 9 exemplarily shows visualization 910 of the touch event for the object 420 on the prototype 200. The trigger included in the interaction scenario may be a visual change of the GUI object included in the prototype, but it may be a non-visual event such as an action of a user targeting the prototype or an input of an external device such as a sensor. Therefore, in step S640, by visualizing the occurrence of the trigger included in the interaction scenario, it allows the user (for example, a developer, etc.) reproducing the interaction scenario of the prototype through the prototype viewing device 120 to recognize the fact that the trigger has occurred and properties of the trigger. In step S640, the occurrence of different types of triggers, such as the user's action on the prototype or an input of an external device such as a sensor, may be visualized in different ways. For example, a tap gesture and a double tap gesture on the prototype 200 may be visualized in different ways. Further, although not shown, various conventional techniques for visualizing sensor detection events of various types of sensors on the user interface 700 may be utilized.

In step S650, on the prototype 200, a response caused by the trigger is output. When the response caused by the trigger is a change in display properties of the GUI object included in the prototype, an output of the response means an operation in which an operation for changing the display property of the object is executed. When the response is haptic feedback or sound feedback, the haptic or sound feedback may be output by a vibration device or a speaker of the prototype viewing device 120. When the response caused by the trigger acts as a trigger that causes a second response, the second response is also serially output.

In step S650, while the response is being output, among the objects 750 indicating each response on the interface 700, an object corresponding to the currently being outputted response may be visually highlighted and displayed.

Figure 8A:
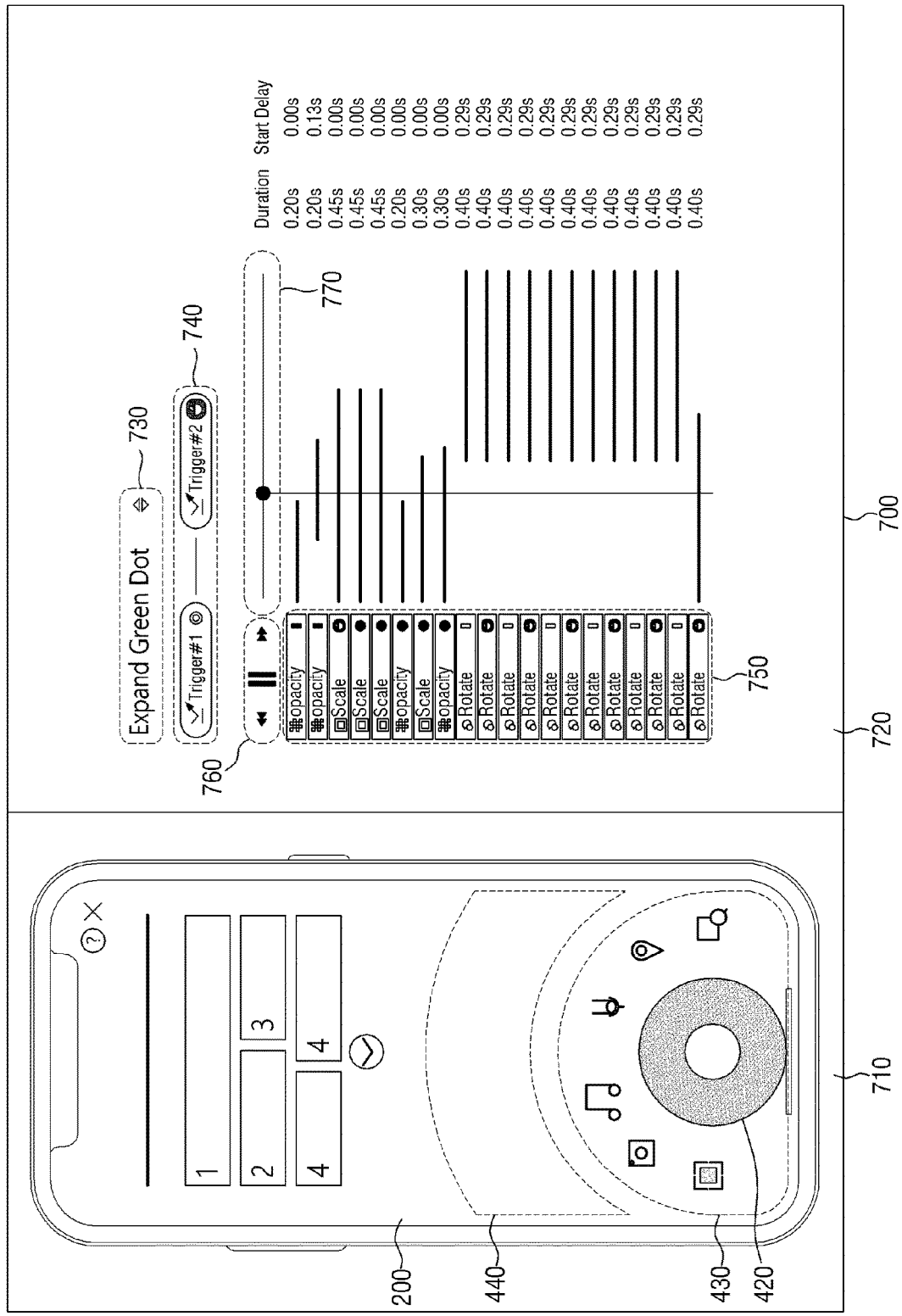
Figure 8B:
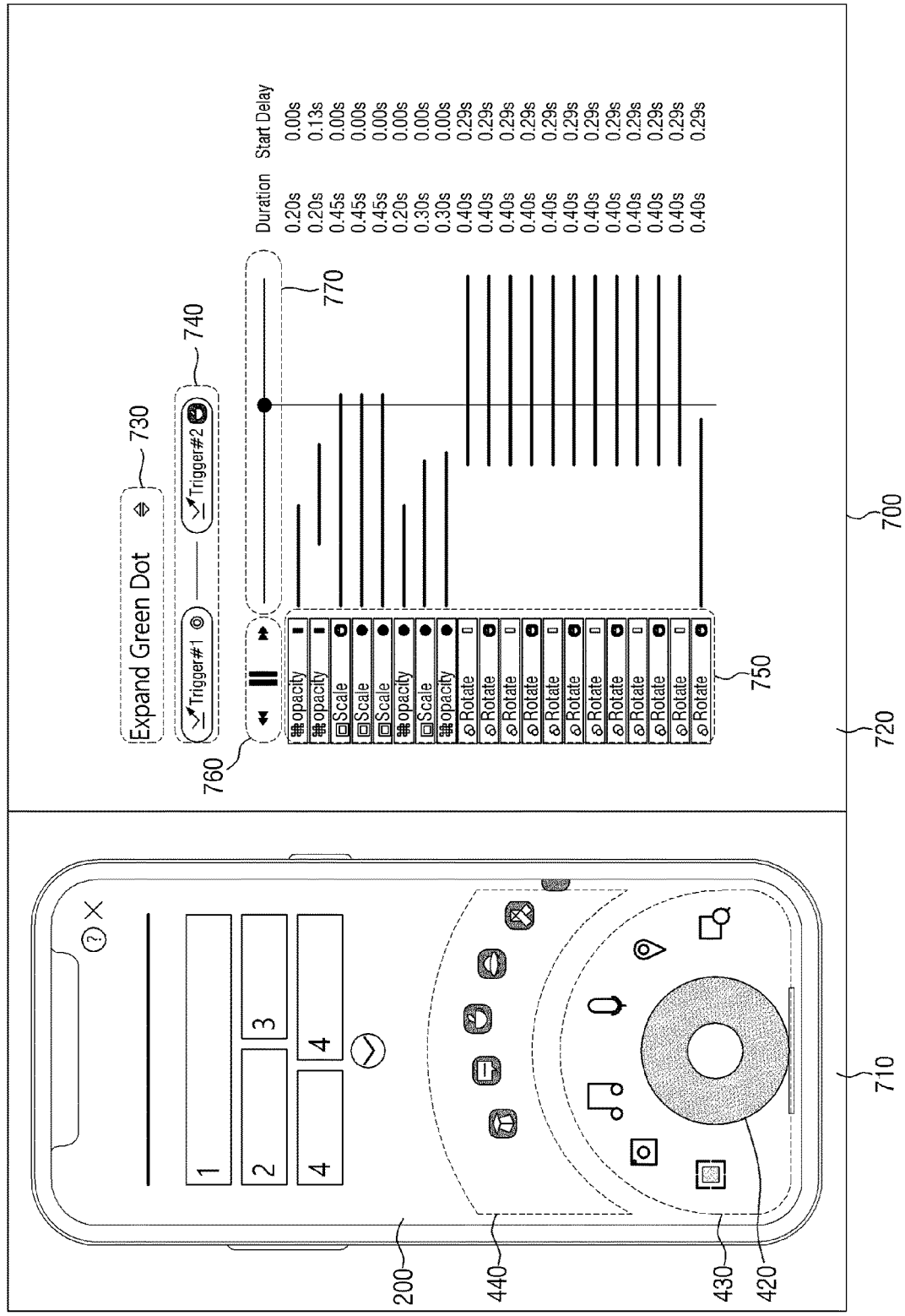

FIGS. 8A to 8C are exemplary diagram sequentially illustrating a process of changing the display properties of the GUI objects on the prototype 200 and a process of changing the user interface 700 caused by the touch event on the object 420 on the prototype 200. The change in the display properties of the GUI objects on the prototype 200 is an example of the response. Referring to the first area 710 of FIGS. 8A to 8C, due to the occurrence of the touch event on the object 420, a change in a size property of the object 420 and a change in transparency of the object 430 and the object 440 were caused over time. Referring to the second area 720 of FIGS. 8A to 8C, a timeline in which the responses caused by the trigger are executed may be visually displayed.

Figure 10:
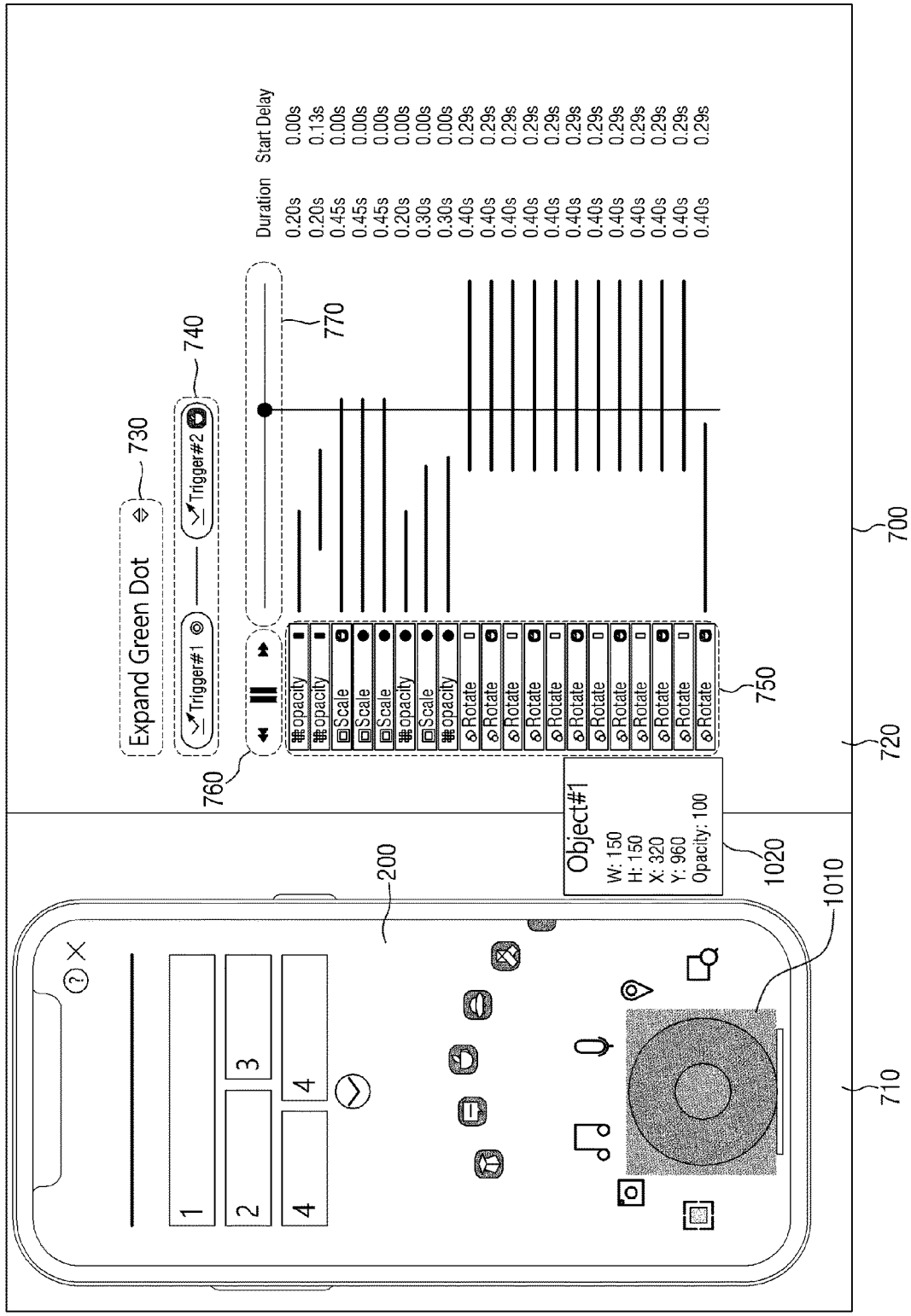

In step S660, during the reproduction of the interaction scenario, a change in property values of objects included in the prototype 200 may be displayed. FIG. 10 is a diagram illustrating a display 1020 of property values of an object 1010 selected by the user at a certain moment in the middle of reproducing the interaction scenario. In the present embodiment, during the reproduction of the interaction scenario, how properties such as location coordinates, a size, and transparency of the object 1010 selected by the user change during the reproduction of the interaction scenario may be displayed. In some embodiments, among the objects 750 indicating the responses, an object corresponding to a response that causes a change in a property of the current object may be highlighted on the interface 700.

In step S670, it may be determined whether the reproduction of the interaction scenario has ended. For example, it may be determined whether all interactions by one or more triggers included in the interaction scenario are reproduced. If the reproduction of the interaction scenario has not been ended, it returns to step S640, and a series of operations such as visualization of the occurrence of a subsequent trigger, output of a response caused by the subsequent trigger, or display of a change in a property value of an object may be performed.

According to the present embodiment, a property of a selected trigger among one or more triggers included in the interaction scenario may be displayed on the interface 700. FIG. 9 is a diagram illustrating details of a trigger (Trigger #1) selected from among a plurality of triggers (Trigger #1 and Trigger #2) included in the interaction scenario, displayed 920 on the interface as an example. In the present embodiment, in response to a user's selection of selecting at least one of the GUI objects 740 corresponding to the plurality of triggers, during or before and after the reproduction of the interaction scenario, detailed properties such as a type of the selected trigger, an occurrence location, and an occurrence condition may be displayed.

Figure 11:
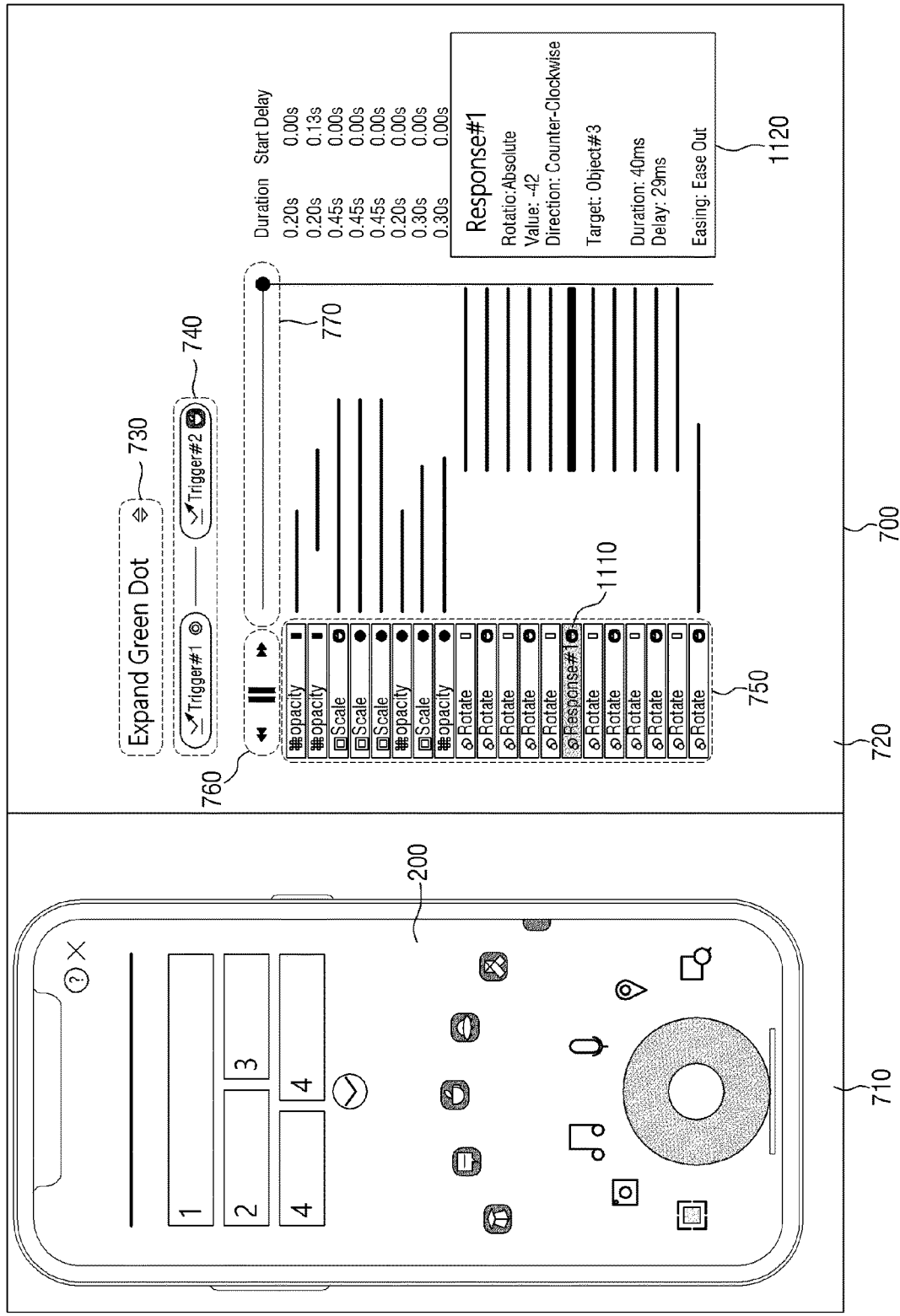

In addition, according to the present embodiment, a property of a selected response among one or more responses included in the interaction scenario may be displayed on the interface 700. FIG. 11 is a diagram illustrating details of a response (Response #1) selected from among a plurality of responses included in the interaction scenario displayed on an interface 1120 as an example. In the present embodiment, in response to a user's selection of selecting at least one of the GUI objects 750 corresponding to the plurality of responses, detailed properties such as a type and degree of the selected response, an object that is a target of the response, an initiation time point, or a duration may be displayed.

Further, according to the present embodiment, a comment added to the interaction scenario may be displayed on the interface 700. For example, a comment added to the interaction scenario by an author who is the user of the prototype authoring device 110 may be displayed on the interface 700 during or before and after the interaction scenario is reproduced.

As described above, the comment may be a comment targeting a part of the prototype 200, a comment targeting some section of the interaction scenario, a comment targeting some triggers included in the interaction scenario, or a comment targeting some responses.

When the comment is a comment targeting a specific object of the prototype 200, during the reproduction of the interaction scenario, the comment may be displayed in an adjacent area of the target object, and further, a relationship between the target object and the comment may be visually expressed.

When the comment is a comment targeting a partial section of the interaction scenario, the comment may be displayed only in the section during the reproduction of the interaction scenario.

When the comment is a comment targeting some triggers included in the interaction scenario, the comment may be displayed at a point in time when a target trigger occurs during the reproduction of the interaction scenario. Furthermore, the relationship between the target trigger and the comment may be visually expressed.

When the comment is a comment targeting some responses included in the interaction scenario, the comment may be displayed at a time point when a target response is output during the reproduction of the interaction scenario. Furthermore, the relationship between the target response and the comment may be visually expressed.

As described above, according to the present embodiment, when viewing the interaction scenario, the user (e.g., an application developer) of the prototype viewing device 120 may easily check the details of triggers and responses included in the prototype, and the changes in display properties of objects in the prototype due to the interaction. In addition, according to the present embodiment, when viewing the interaction scenario, the user (e.g., an application developer) of the prototype viewing device 120 may easily check the author's comment added to the interaction scenario. Accordingly, contents of the interaction intended by the author of the prototype may be effectively delivered to a developer or the like.

The process of reproducing the interaction scenario through steps S640 to S660 of the present embodiment may be partially performed targeting a part of the interaction scenario according to the user's selection. In this case, prior to step S640, a user's input for selecting a part of the interaction scenario may be obtained, and the interaction scenario may be reproduced targeting the selected part. Some of the interaction scenarios may be some sections on the timeline of the interaction scenario, some of the one or more triggers included in the interaction scenario, some of the one or more responses caused by the triggers included in the interaction scenario, and some of one or more objects included in the prototype 200. The user may selectively specify some of the objects 740, 750, 770 displayed on the interface 700 or the objects included in the prototype 200, so that through steps S640 to S660, a part of the interaction scenario to be reproduced may be selectively reproduced.

Figure 12:
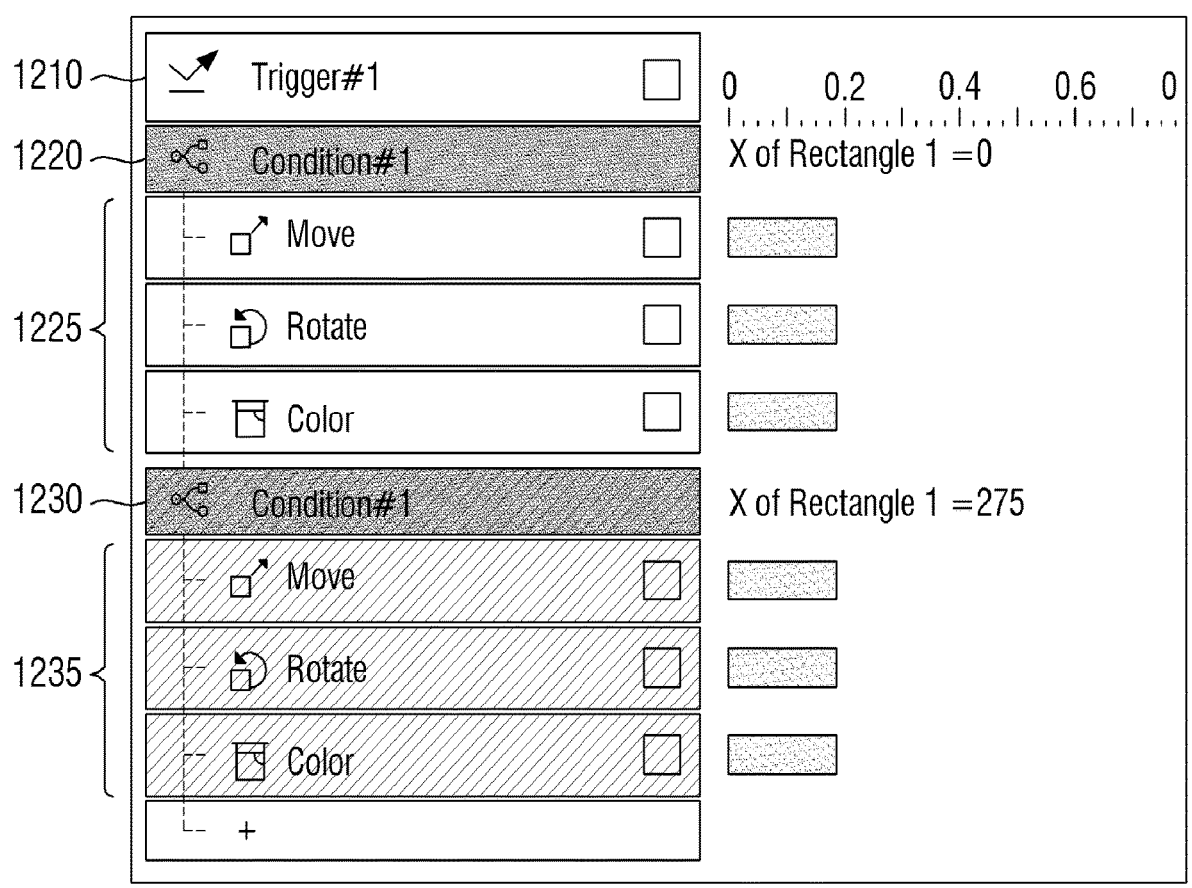

According to some embodiments of the present inventive concept, the trigger may be defined to cause different responses according to an occurrence condition of the trigger. In other words, the prototype may include an interaction set having branches according to conditions. The prototype may include, for example, an interaction set in which a first response is caused when a first condition is satisfied with occurrence of a trigger, and a second response is caused when the first condition is not satisfied with the occurrence of the trigger. FIG. 12 is a diagram illustrating an exemplary state in which triggers having conditions and responses caused according to the conditions are displayed on the interface 700 as described above.

Referring to FIG. 12, an object 1210 represents a trigger, an object 1220 indicates a first condition that may be satisfied when the trigger occurs, and an object 1230 represents a second condition different from the first condition that is likely to be satisfied when the trigger occurs. Objects 1225 represent first responses caused when the first condition is satisfied when a trigger occurs, and objects 1235 represent second responses caused when the second condition is satisfied when a trigger occurs. More specifically, FIG. 12 shows an example of an interaction set in which different responses 1225 and 1235 are caused depending on whether the condition satisfied at the time Trigger #1 occurs is the first condition (an X coordinate of Rectangle 1 is 0) or the second condition (an X coordinate of Rectangle 1 is 275).

When an interaction set having branches according to conditions is reproduced on the prototype 200 while the interaction scenario for the prototype 200 is reproduced through steps S640 to S660 of the embodiment described with reference to FIG. 6, a satisfied condition and an unsatisfied condition may be visually divided and displayed on the interface 700 when a trigger is occurred. For example, when the first condition is satisfied and the second condition is not satisfied when the trigger occurs, the objects 1230 and 1235 related to the second condition may be displayed in an inactive state as illustrated in FIG. 12.

In some embodiments of the present inventive concept, a function of forcibly outputting second responses corresponding to the second condition may be provided in a situation where the first condition is satisfied during the reproduction of the interaction scenario. Furthermore, when the second responses corresponding to the second condition are forcibly output in the situation where the first condition is satisfied, a visual display indicating the forced output may be displayed on the objects 1235 indicating the second response or adjacent to the objects 1235. In some embodiments of the present inventive concept, by providing the function of forcibly outputting the second responses corresponding to the second condition that is not satisfied during the reproduction of the interaction scenario, a prototype viewer may reproduce situations that were not demonstrated when creating the interaction scenario by a prototype author.

Until now, the method for reproducing the interaction scenario targeting the prototype has been described according to an embodiment of the present inventive concept with reference to FIGS. 6 to 12. Hereinafter, with reference to FIGS. 13 to 15, a method that may be used to effectively deliver changes occurring in a prototype of a graphical user interface will be described.

In a process of producing a prototype of a graphical user interface, the prototype is frequently and constantly modified. When a producer of the graphical user interface modifies the prototype of an existing version, it is necessary to communicate the modifications to an application planner and/or developer. To this end, there may be situations in which the prototype producer must write a document describing the modifications of interactions included in the prototype and deliver it to the developer, or create and deliver an interaction scenario for the modified prototype from the beginning. A lot of time and cost may be wasted in the process.

The present embodiment relates to a method for effectively delivering changes occurring in a prototype of a graphical user interface by automatically reflecting changes occurring in a prototype of a graphical user interface to an existing produced interaction scenario. A method for providing an interaction scenario according to the present embodiment may be performed by the prototype authoring device 110.

Figure 13:
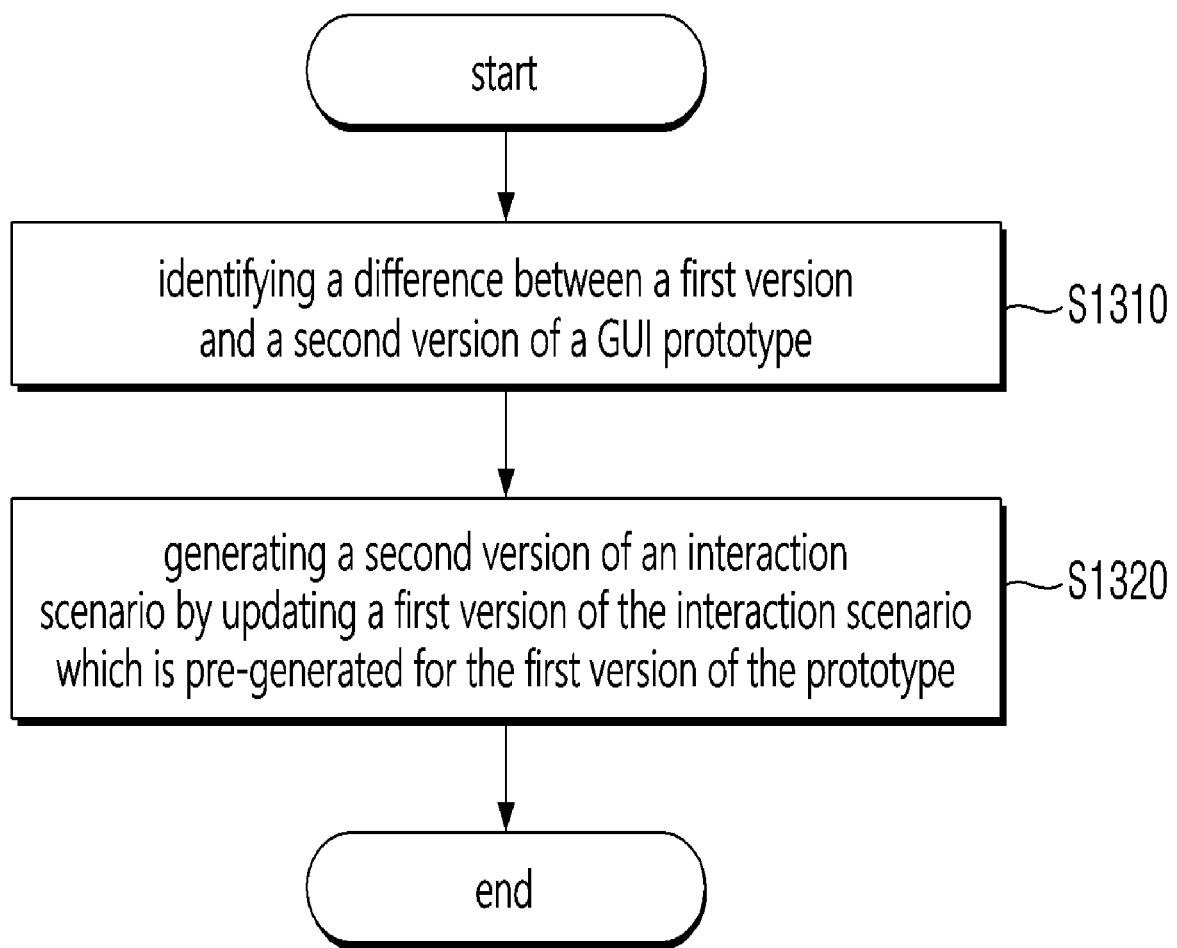
FIG. 13 is a flow chart illustrating a process of performing a method for providing an interaction scenario of a prototype of a graphical user interface according to another embodiment of the present inventive concept.

Referring to FIG. 13, the method includes identifying a difference between a first version and a second version of a prototype (S1310), and automatically generating a second version of an interaction scenario for the prototype by updating a first version of the interaction scenario for the prototype (S1320).

In the embodiment, the second version of the prototype of the graphical user interface may be a result of applying modifications to the first version of the prototype. A process of modifying the prototype of the graphical user interface may include adding or deleting triggers, responses, and/or objects included in the prototype, or changing property values. In other words, the difference between the first version and the second version of the prototype may include adding or deleting triggers, responses, and/or objects included in the prototype, or changing property values.

In the embodiment, the first version of the interaction scenario for the prototype refers to an interaction scenario that has been pre-generated to describe the first version of the prototype, for example by the method according to an embodiment described with reference to FIGS. 2 to 5. Further, the second version of the interaction scenario for the prototype refers to an interaction scenario that is automatically generated for the second version of the prototype based on the first version of the interaction scenario for the prototype.

In step S1310, the first version and the second version of the prototype are compared, and additions or deletions of the triggers, responses, and/or objects included in the prototype, or changes in the property values are identified.

In step S1320, the identified additions and deletions of the trigger, response, and/or object, and changes in the property values are reflected in the first version of the interaction scenario.

Specifically, when a new response or object is added to the prototype, the second version of the interaction scenario may be generated by adding the response or object to the first version of the interaction scenario. In addition, when a response or object previously included in the prototype is deleted, the second version of the interaction scenario may be generated by deleting the response or object from the first version of the interaction scenario. Likewise, when a response included in a prototype or an existing property value of an object is changed, the second version of the interaction scenario may be generated by modifying the changed property values in the first version of the interaction scenario.

Similarly, when a trigger previously included in the first version of the prototype is deleted or a property value of a trigger is changed, the second version of the interaction scenario may be generated by deleting the trigger from the first version of the interaction scenario or modifying the changed trigger property values in the first version of the interaction scenario.

In the following with reference to FIGS. 14 and 15, when a trigger included in the first version of the prototype is replaced with a new trigger, or a new trigger that was not included in the first version of the prototype is added to the second version of the prototype, a method for automatically reflecting this to the interaction scenario will be described.

Figure 14:
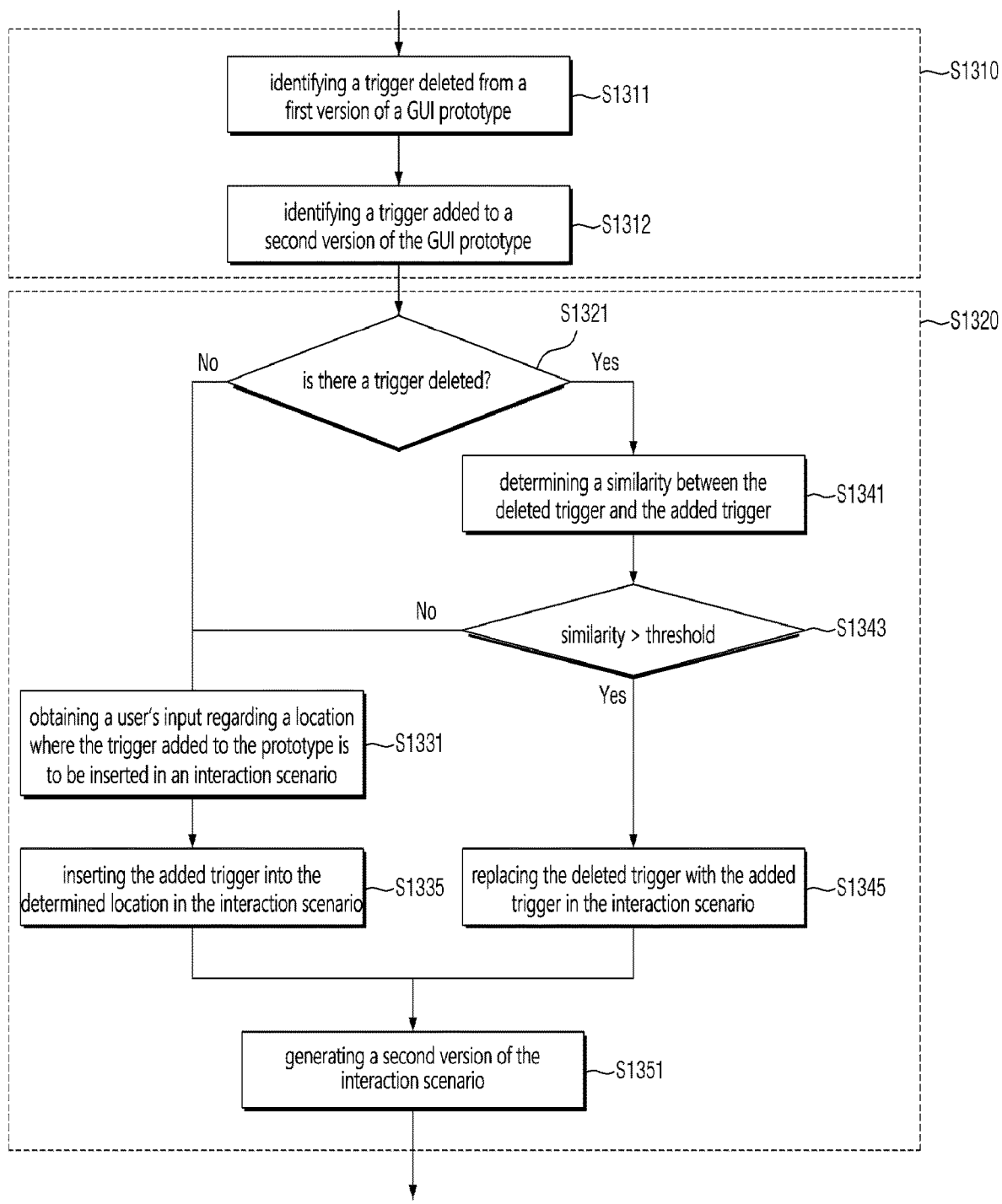
FIGS. 14 and 15 are diagrams for explaining in more detail some steps of the method described with reference to FIG. 13.

Referring to FIG. 14, a trigger deleted from the first version of the prototype is identified in step S1311, and a trigger newly added to the second version of the prototype is identified in step S1312. Steps S1311 and S1312 may be understood as a part of step S1310 described with reference to FIG. 13.

In step S1321, it is determined whether there is a trigger deleted from the first version. If there is no deleted trigger, it proceeds to step S1331, and if there is a deleted trigger, it proceeds to step S1341.

In step S1331, a user's input regarding a location where a trigger newly added to the second version of the prototype is to be inserted in the interaction scenario is obtained. Subsequently, in step S1335, the added trigger is inserted into the interaction scenario. Here, the trigger is inserted at a location determined based on the user input obtained in step S1331.

Hereinafter, a process of obtaining a user input regarding a trigger insertion location in step S1331 will be described in more detail with reference to FIG. 15.

Figure 15:
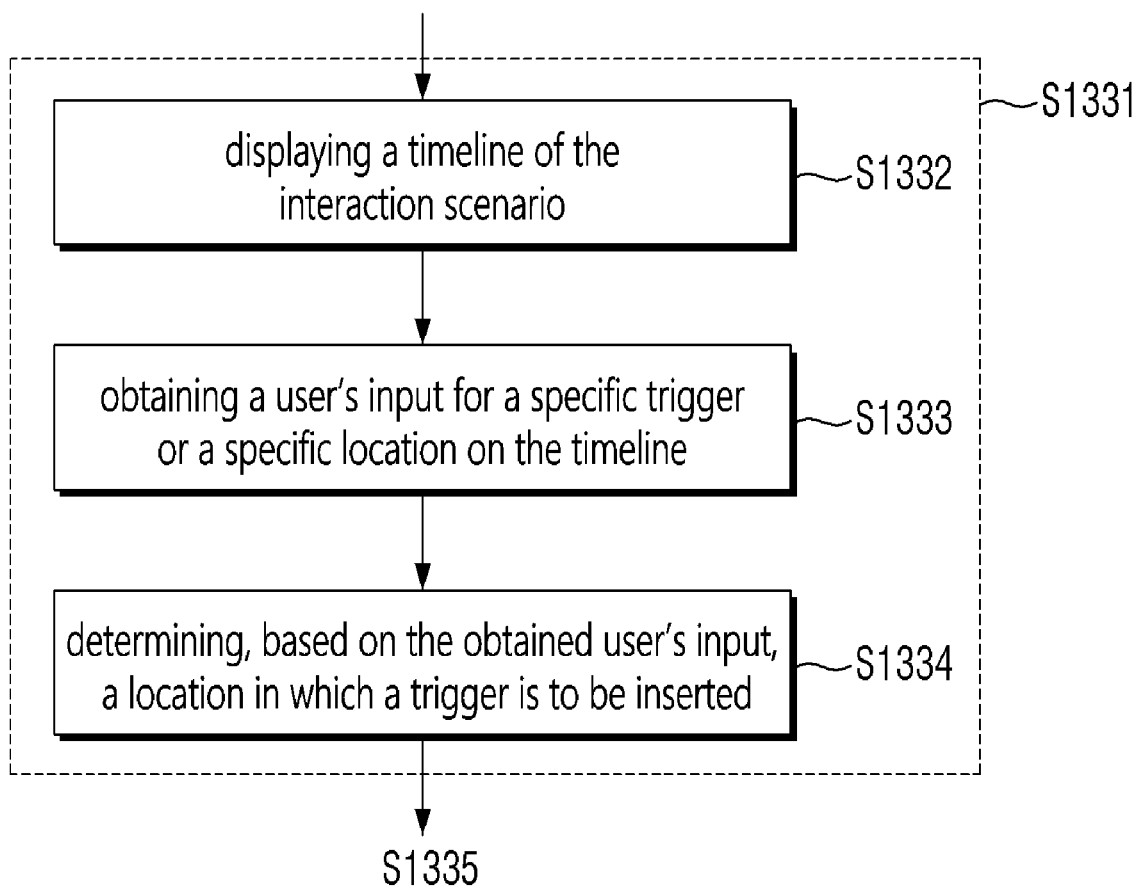

Referring to FIG. 15, in step S1332, the timeline of the interaction scenario is displayed. The timeline of the interaction scenario may be displayed by, for example, the GUI objects 740 indicating triggers included in the interaction scenario shown in FIG. 7, the progress bar 770, the GUI objects 780 indicating the initiation time and duration time of the responses, or the like.

In an embodiment, in step S1333, a user's input for selecting any one of triggers included in the interaction scenario may be obtained. For example, a user's input for selecting any one of the GUI objects 740 shown in FIG. 7 may be obtained. Subsequently, in step S1334, a location immediately before or immediately after the selected trigger may be determined as a location in which a new trigger is to be inserted. In some embodiments, a user's input regarding whether a new trigger is to be inserted immediately before the selected trigger or a new trigger is to be inserted immediately after the selected trigger may be additionally obtained.

In another embodiment, in step S1333, a user's input for selecting a specific location on a timeline indicating a specific time point during the progress of the interaction scenario may be obtained. For example, a user input for selecting a specific location on the progress bar 770 shown in FIG. 7 or on the GUI objects 780 indicating the initiation time and duration time of the responses may be obtained. Subsequently, in step S1334, the selected location on the timeline may be determined as a location in which a new trigger is to be inserted.

It will be described with reference to FIG. 14 again. The trigger newly added to the second version of the prototype is inserted at a location determined through the steps described with reference to FIG. 15 (step S1335), and the second version of the interaction scenario may be generated (step S1351).

When it is determined in step S1321 shown in FIG. 14 that there is a trigger deleted from the first version, it proceeds to step S1341.

In step S1341, a similarity between the trigger deleted from the first version of the prototype and the trigger added to the second version of the prototype is determined, and in step S1343, it is determined whether the similarity exceeds a threshold.

In an embodiment, the similarity between the deleted trigger and the added trigger may be determined by a similarity or overlap of responses caused by each trigger. If responses caused by the deleted trigger and responses caused by the added trigger overlap each other by a predetermined ratio or more, it may be determined in step S1343 that the similarity exceeds the threshold.

On the other hand, if the responses caused by the deleted trigger and the responses caused by the added trigger are not related to each other, it may be determined in step S1343 that the similarity is less than or equal to the threshold.

In another embodiment, the similarity between the deleted trigger and the added trigger may be determined based on whether GUI objects for which a change in display properties is caused by each trigger are the same. In other words, if the deleted trigger and the added trigger cause a change to the same GUI object, the similarity between the deleted trigger and the added trigger may be evaluated to be high, whereas if the deleted trigger and the added trigger are triggers that cause changes to different GUI objects, the degree of similarity between the two triggers may be evaluated to be low.

In step S1343, when the similarity is less than or equal to the threshold, it proceeds to step S1331. If it is determined in step S1343 that the similarity exceeds the threshold, it may be preferable that the trigger added to the second version of the prototype replaces the trigger deleted from the first version of the prototype. In this case, it proceeds to step S1345.

In step S1345, in the interaction scenario, the deleted trigger is replaced with the added trigger. In other words, the trigger added to the second version of the interaction scenario is inserted at a location where the deleted trigger was in the first version of the interaction scenario. Reflecting such replacement of the trigger, the second version of the interaction scenario may be automatically generated (step S1351).

Until now, with reference to FIGS. 13 to 15, a method for automatically generating a new version of the interaction scenario reflecting the changes by reflecting changes occurring in the prototype of the graphical user interface to the previously produced interaction scenario has been described. According to the present embodiment, triggers, responses, and objects deleted from the prototype or modified property values are automatically reflected in the interaction scenario, and newly added triggers, responses, and objects are automatically inserted in an appropriate location of the interaction scenario. As a result, changes in the prototype may be effectively communicated to a third party without the need to separately explain changes occurring in the prototype of the graphical user interface or to create a new version of the interaction scenario reflecting the changes.

Hereinafter, a method for reproducing an interaction scenario in which changes in a prototype of a graphical user interface are reflected will be described with reference to FIGS. 16 to 18. In particular, a method for displaying changes occurring in a prototype of a graphical user interface by reproducing a first version and a second version of an interaction scenario together will be described. The method for reproducing the interaction scenario according to the present embodiment may be performed by the prototype viewing device 120.

16 is a flow chart illustrating a process of performing a method for providing a prototype of a graphical user interface according to an embodiment of the present inventive concept.

First, in step S1610, the prototype viewing device 120 obtains an interaction scenario. The interaction scenario may be obtained from the prototype providing server 130 or the prototype authoring device 110. In an embodiment in which a graphic user interface prototype and the interaction scenario are provided as separate data, the prototype of the graphic user interface may also be obtained in step S1610.

In step S1610, the prototype viewing device 120 may obtain a first version and a second version of the interaction scenario. The first version of the interaction scenario may be an interaction scenario generated for the first version of the prototype, and the second version of the interaction scenario may be an interaction scenario generated for the second version of the prototype. At least a portion of the first version and the second version of the interaction scenario may be different from each other. For example, triggers included in the first version of the interaction scenario and triggers included in the second version of the interaction scenario may be different from each other. In addition, responses included in the first version of the interaction scenario and responses included in the second version of the interaction scenario may be different from each other.

In step S1620, the prototype viewing device 120 may display a user interface for reproducing the first version and the second version of the interaction scenario for the prototype.

Figure 17:
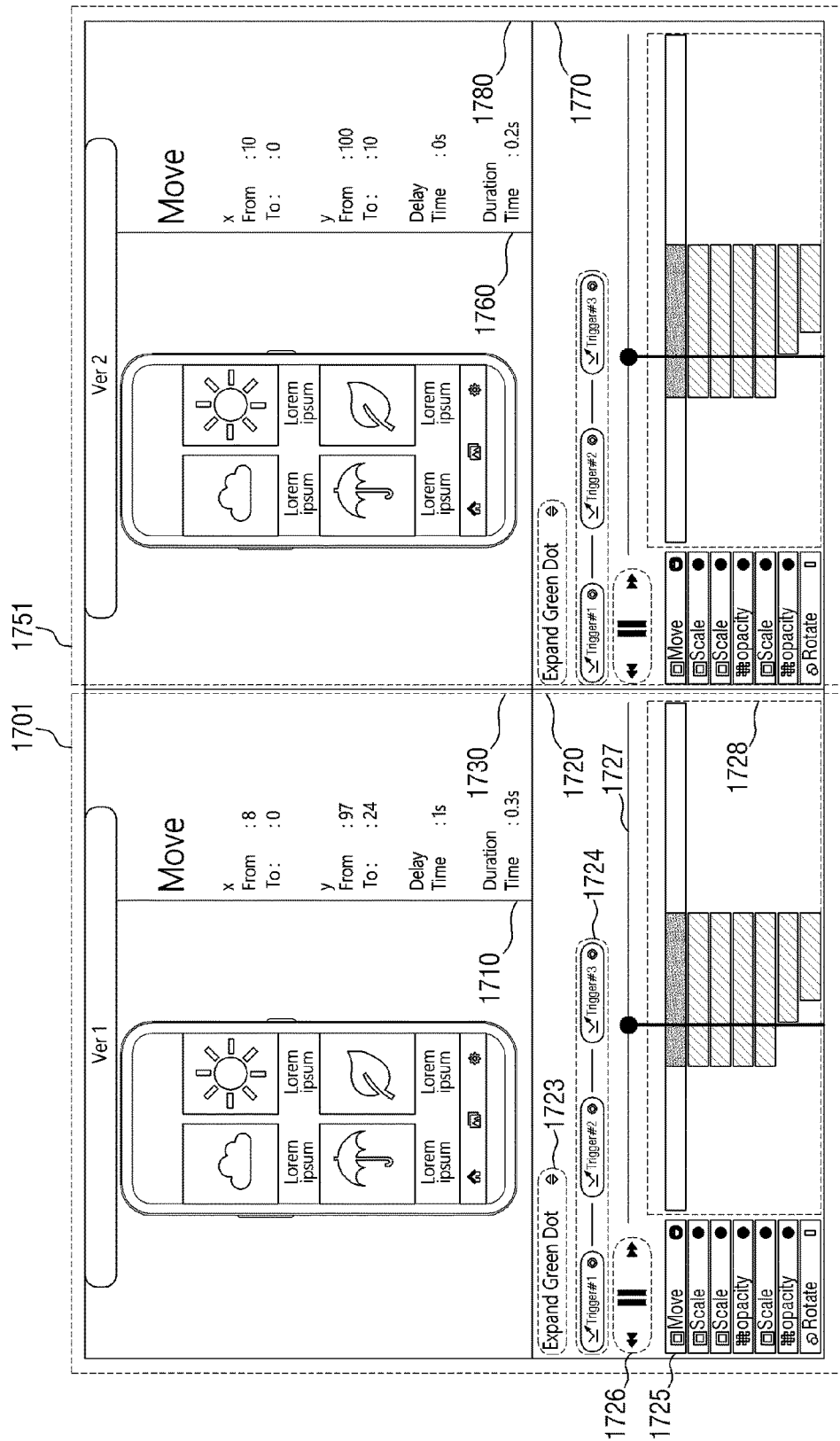
FIGS. 17 to 18 are diagrams for explaining a process of reproducing a first version and a second version of an interaction scenario of a graphical user interface prototype according to the embodiment described with reference to FIG. 16.
Figure 18:
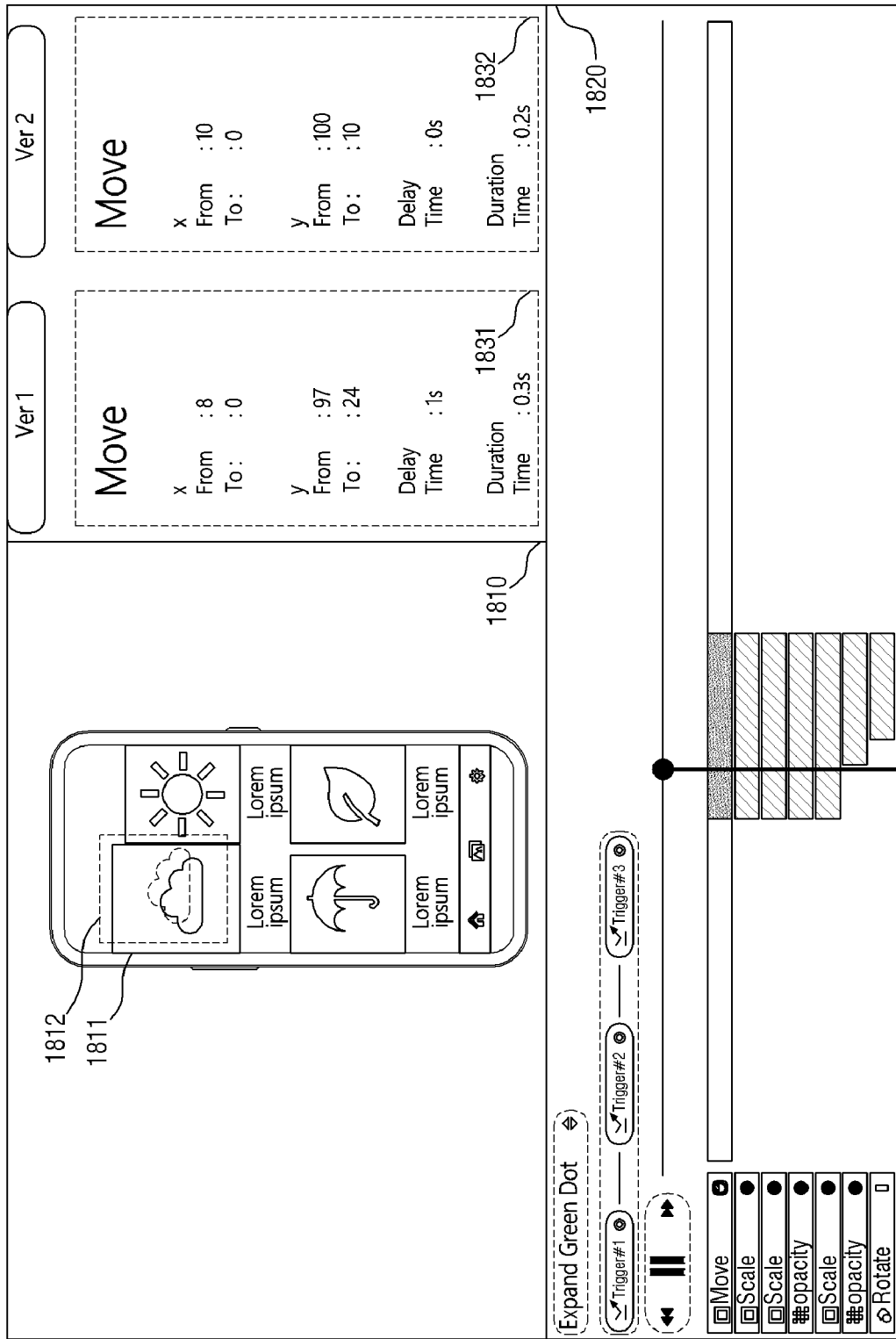

FIG. 17 is an exemplary user interface for reproducing a first version and a second version of an interaction scenario for a prototype according to an embodiment of the present inventive concept, and FIG. 18 is an exemplary user interface for reproducing a first version and a second version of an interaction scenario for a prototype according to another embodiment of the present inventive concept.

First, in the embodiment shown in FIG. 17, the user interface includes a first area 1701 for reproducing the first version of the interaction scenario and a second area 1751 for reproducing the second version of the interaction scenario. The first area 1701 and the second area 1751 include detailed area for displaying the prototype 1710 and 1760, detailed areas for control the reproduction of the interaction scenario and for display details and a timeline of the interaction scenario 1720 and 1770, detailed areas for displaying property values specified in triggers, responses, or objects included in the prototype 1730 and 1780, or the like, respectively. In step S1620, the prototype is displayed in the detailed areas 1710 and 1760, respectively.

In step S1630, a command to initiate reproduction of the interaction scenario is received. For example, a user's input for selecting a reproduction start button among GUI objects 1762 for controlling reproduction of the interaction scenario may be received.

In step S1640, the first version and the second version of the interaction scenario for the prototype are reproduced, occurrence of triggers included in the interaction scenario is visualized during the reproduction, and responses caused by the trigger are output on the prototype displayed in the detailed areas 1710 and 1760, respectively.

In some embodiments, in step S1640, the first version and the second version of the interaction scenario may be synchronized with each other and reproduced together.

The synchronized reproduction of the first version and the second version of the interaction scenario includes simultaneous reproduction of the first version and the second version in response to the command to initiate reproduction of the interaction scenario. Specifically, the first version may be reproduced in the first area 1701 and, at the same time, the second version may be reproduced in the second area 1702.

The synchronized reproduction of the first version and the second version of the interaction scenario makes it possible to easily grasp a difference between the first version and the second version of the interaction scenario. For example, when a user selects any one of a plurality of triggers 1724 included in the first version of the interaction scenario, responses 1725 caused by the selected trigger may be displayed in the area 1720, and detailed properties specified for the selected trigger may be displayed in the area 1730. Furthermore, a trigger corresponding to the selected trigger may be identified among a plurality of triggers included in the second version of the interaction scenario, responses caused by the identified trigger may be displayed in the area 1770, and detailed properties specified to the identified trigger may be displayed in the area 1780. Similarly, when the user selects any one of a plurality of responses 1725 included in the first version of the interaction scenario, detailed properties specified in the selected response may be displayed in the area 1730, while a response corresponding to the selected response among a plurality of responses included in the second version of the interaction scenario may be identified, and detailed properties specified for the identified response may be displayed in the area 1780. In this way, the first version and the second version of the interaction scenario are reproduced in synchronization with each other in the regions 1701 and 1751, so that the user may easily grasp the differences or changes between the first version and the second version.

Meanwhile, in the case of the embodiment shown in FIG. 18, the first version and the second version of the interaction scenario may be reproduced within one display area. This is different from the embodiment shown in FIG. 17 in which the first version and the second version are reproduced side by side in different areas 1701 and 1751.

Referring to FIG. 18, the user interface includes a detailed area for displaying the prototype 1810, a detailed area for control the reproduction of the interaction scenario and for display details and a timeline of the interaction scenario 1820, detailed areas for displaying property values specified in triggers, responses, or objects included in the prototype 1831 and 1832, or the like, respectively.

In the embodiment shown in FIG. 18, in step S1640, the first version and the second version of the interaction scenario are synchronized and reproduced together, but they may be reproduced simultaneously in one area. Specifically, a portion in which the first version or the second version of the interaction scenario are the same may be typically displayed, and a portion having a difference between the first version and the second version of the interaction scenario may be displayed by translucently overlapping the corresponding portion of the second version on the corresponding portion of the first version, thereby causing the first version and the second version to be synchronized and reproduced together in one region 1810.

For example, FIG. 18 exemplarily illustrates a case where a change occurs in a moving distance of GUI elements 1811 and 1812 between the first version and the second version of a GUI prototype. Referring to FIG. 18, the GUI element 1812 is translucently overlaid on the GUI element 1811 and displayed, and thus, the change in the moving distance of the GUI elements 1811 and 1812 may be displayed simultaneously within one area 1810.

Meanwhile, in some other embodiments, any one version selected by the user among the first version and the second version of the interaction scenario may be reproduced in the area 1810. Then, if another version is selected by the user during reproduction of the selected version, the other selected version may be subsequently reproduced in the region 1810.

For example, the first version of the interaction scenario may be reproduced in the region 1810 by the user's selection, and then a user's input for requesting the reproduction of the second version may be obtained. In this case, a first response currently being output being reproduced is identified in the first version of the interaction scenario, and the output of the first response may be stopped. Then, a second response may be identified in the second version of the interaction scenario. If the second response of the second version of the interaction scenario is identified, as the second response is output in the same area 1810, the reproduction of the second version of the interaction scenario may be initiated in the same area 1810.

Here, the second response is a response corresponding to the first response included in the first version of the interaction scenario among responses included in the second version of the interaction scenario. For example, the first response included in the first version and the second response included in the second version may be responses having the same or corresponding location on the timeline of each version.

As described above, in some embodiments of the present inventive concept, when the user requests to reproduce the second version while the first version of the interaction scenario is being reproduced, the second version may be continuously reproduced within the same area 1810 without leaving a screen currently being viewed by the user while maintaining the timeline on the currently reproduced interaction scenario. As a result, the user may easily check the difference between the first version and the second version on one screen without the hassle of reproducing the first version and the second version of the interaction scenario separately.

Figure 16:
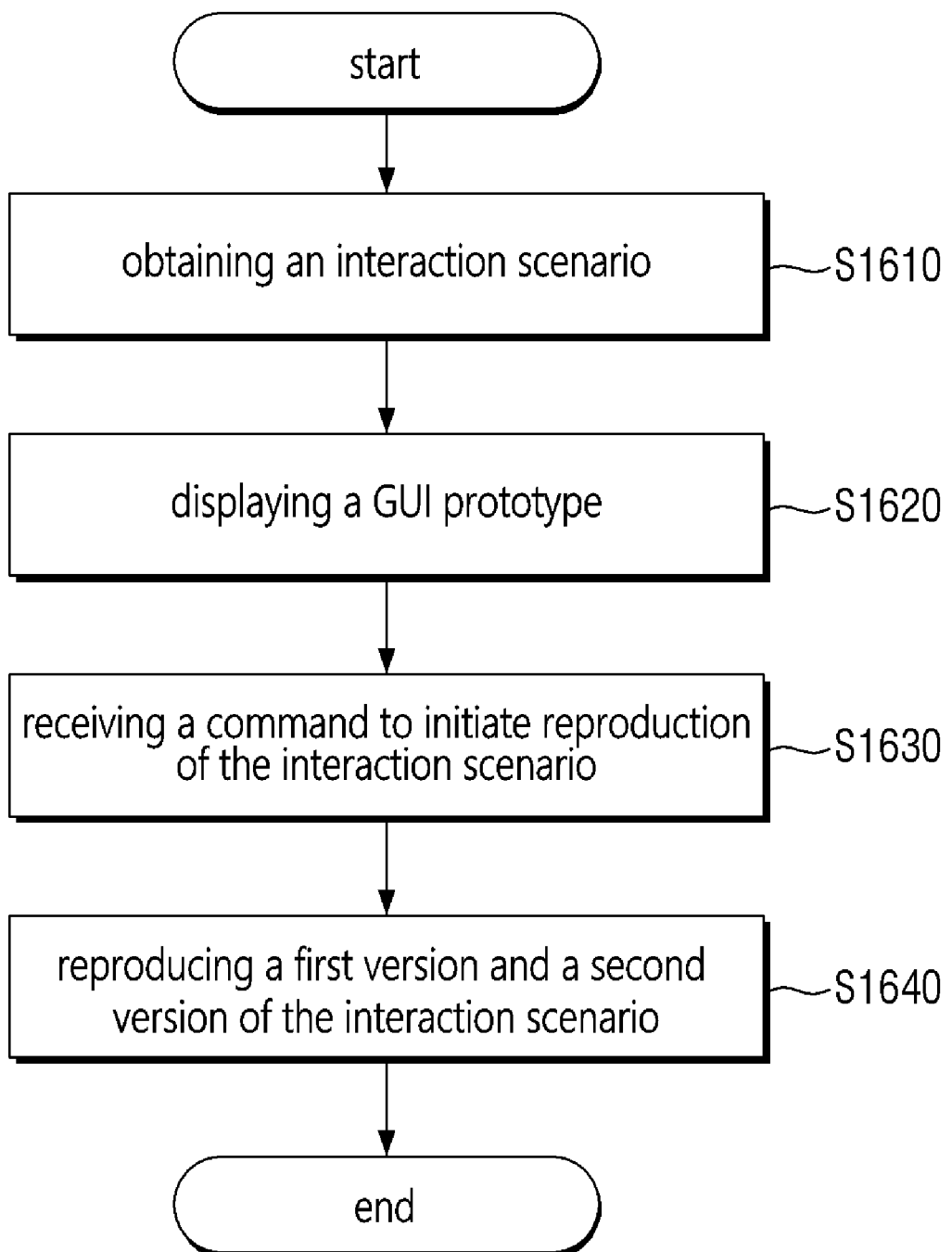
FIG. 16 is a flow chart illustrating a process of performing a method for providing a prototype of a graphical user interface according to another embodiment of the present inventive concept.

Until now, with reference to FIGS. 16 to 18, the method for displaying the changes occurring in the prototype of the graphical user interface by reproducing the first version and the second version of the interaction scenario for the prototype of the graphical user interface together has been described. According to some embodiments of the present method, the first version and the second version of the interaction scenario are displayed side by side or overlapped with each other in one user interface screen and simultaneously reproduced, such that the differences or changes between the first version and the second version may be easily recognized by the user. According to some other embodiments of the present method, the interface is provided that allows the user to reproduce the first version and the second version of the interaction scenario by crossing each other in one area, such that it enables the user to easily check the difference between the first version and the second version on a single screen without the hassle of reproducing each of the first version and the second version separately.

Until now, the method for providing the prototype of the graphical user interface according to various embodiments of the present inventive concept has been described with reference to FIGS. 2 to 18. Hereinafter, an exemplary computing device 1500 capable of implementing the methods described in various embodiments of the present disclosure will be described with reference to FIG. 19.

Figure 19:
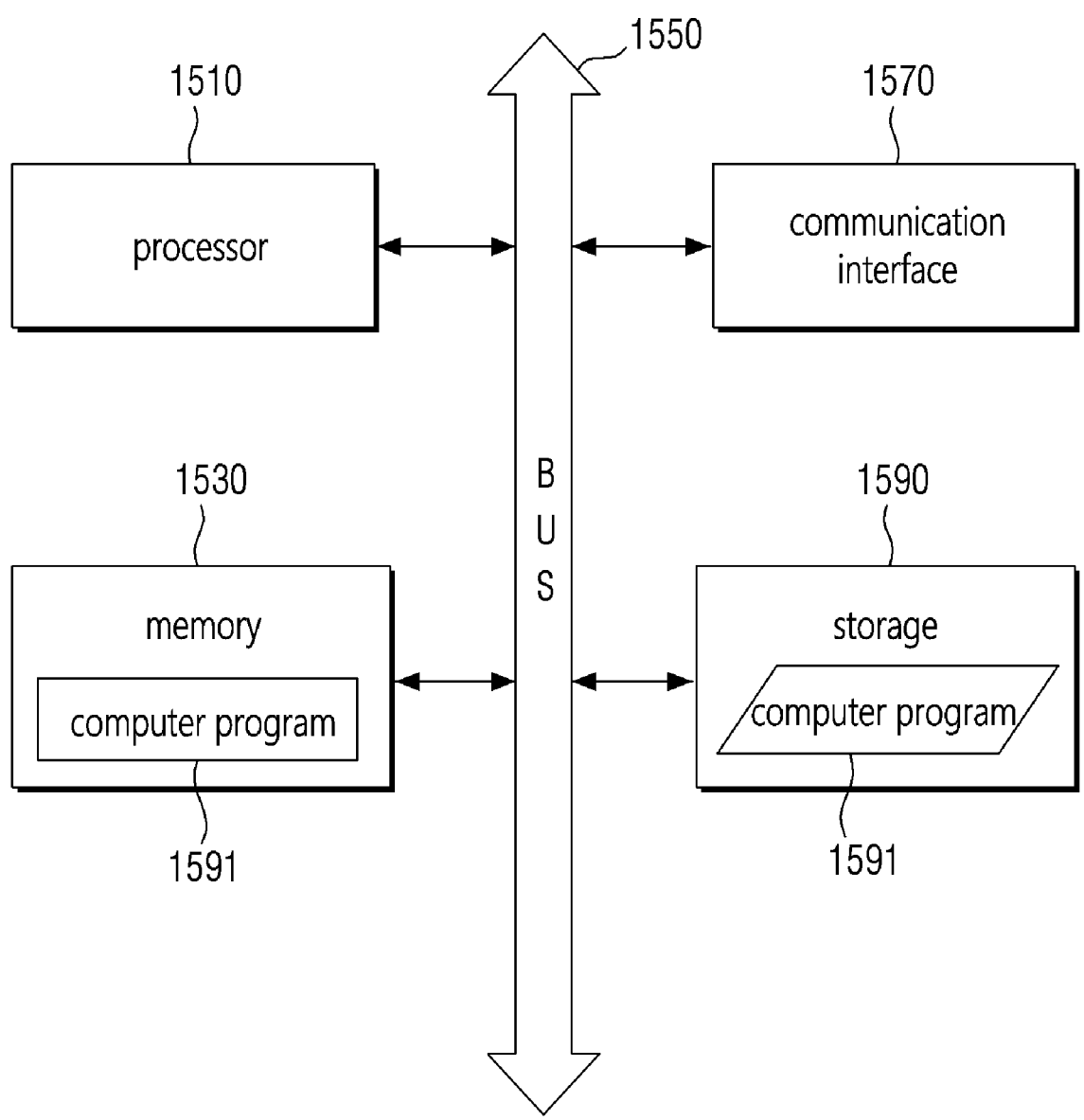
FIG. 19 is a diagram illustrating an exemplary computing device capable of implementing various embodiments of the present inventive concept.

FIG. 19 is an example hardware diagram illustrating a computing device 1500.

As shown in FIG. 19, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 19 illustrates only the components related to the embodiment of the present disclosure. Therefore, it will be appreciated by those skilled in the art that the present disclosure may further include other general purpose components in addition to the components shown in FIG. 19.

The processor 1510 controls overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 stores various data, instructions and/or information. The memory 1530 may load one or more programs 1591 from the storage 1590 to execute methods/operations according to various embodiments of the present disclosure.

The bus 1550 provides communication between components of the computing device 1500. The bus 1550 may be implemented as various types of bus such as an address bus, a data bus and a control bus.

The communication interface 1570 supports wired and wireless internet communication of the computing device 1500. The communication interface 1570 may support various communication methods other than internet communication. To this end, the communication interface 1570 may be configured to comprise a communication module well known in the art of the present disclosure.

The storage 1590 can non-temporarily store one or more computer programs 1591. The storage 1590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for providing a prototype of a graphical user interface (GUI), comprising:
 obtaining, by a prototype viewing device, an interaction scenario including information on a trigger occurred on a GUI prototype; and
 by the prototype viewing device, reproducing the interaction scenario, on a first area for displaying the prototype by outputting a response automatically caused by a trigger included in the interaction scenario,
 wherein the prototype comprises information on a trigger and a response to be caused by the trigger,
 wherein reproducing the interaction scenario comprises,
 obtaining a user's input for selecting one of GUI objects for controlling reproduction of at least one part of the interaction scenario, on a second area for displaying details of the interaction scenario, the second area being different from the first area; and
 reproducing, on the first area, the at least one part of the interaction scenario corresponding to the selected one of GUI objects based on the user's input,
 wherein the user's input is an input for selecting the GUI object corresponding to at least one of one or more triggers included in the interaction scenario, or an input for selecting the GUI object corresponding to at least one of one or more responses to be caused by the one or more triggers, on the second area.

2. The method of claim 1, wherein reproducing the interaction scenario, on the first area for displaying the prototype comprises, visualizing occurrence of the trigger included in the interaction scenario on the prototype.

3. The method of claim 2, wherein the trigger comprises a first type of trigger and a second type of trigger, and
 wherein visualizing occurrence of the trigger comprises visualizing occurrence of the first type of trigger in a first display property, and visualizing occurrence of the second type of trigger in a second display property.

4. The method of claim 1 further comprises displaying a property of the trigger included in the interaction scenario.

5. The method of claim 1 further comprises displaying a property of the response.

6. The method of claim 1, wherein reproducing the interaction scenario, on the first area for displaying the prototype comprises displaying a change in display property values of an object included in the prototype over time.

7. A prototype viewing device comprising:
one or more processors;
a memory for loading a computer program executed by the processor; and
a storage for storing the computer program,
wherein the computer program comprises,
an instruction for obtaining an interaction scenario including information on a trigger occurred on a GUI prototype, and
an instruction for reproducing the interaction scenario, on a first area for displaying the prototype by outputting a response automatically caused by a trigger included in the interaction scenario,
wherein the prototype comprises information on a trigger and a response to be caused by the trigger,
wherein the instruction for reproducing the interaction scenario comprises,
an instruction for obtaining a user's input for selecting one of GUI objects for controlling reproduction of at least one part of the interaction scenario, on a second area for displaying details of the interaction scenario, the second area being different from the first area, and
an instruction for reproducing, on the first area, the at least one part of the interaction scenario corresponding to the selected one of GUI objects based on the user's input,
wherein the user's input is an input for selecting the GUI object corresponding to at least one of one or more triggers included in the interaction scenario, or an input for selecting the GUI object corresponding to at least one of one or more responses to be caused by the one or more triggers, on the second area.

8. The device of claim 7, wherein the trigger comprises a first type of trigger and a second type of trigger, and
wherein the instruction for reproducing the interaction scenario for the prototype comprises an instruction for visualizing occurrence of the first type of trigger in a first display property, and visualizing occurrence of the second type of trigger in a second display property.

9. The device of claim 7, wherein the instruction for reproducing the interaction scenario for the prototype comprises an instruction for displaying a change in display property values of an object included in the prototype over time.

* * * * *